United States Patent
Takahashi

(10) Patent No.: US 10,684,121 B2
(45) Date of Patent: Jun. 16, 2020

(54) DISTANCE-MEASURING APPARATUS WHICH USES DIFFERENT CALCULATIONS DEPENDING ON WHETHER THE OBJECT IS DYNAMICALLY CHANGING

(71) Applicant: Ricoh Company, Ltd., Tokyo (JP)

(72) Inventor: Shu Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 97 days.

(21) Appl. No.: 15/712,311

(22) Filed: Sep. 22, 2017

(65) Prior Publication Data

US 2018/0106599 A1    Apr. 19, 2018

(30) Foreign Application Priority Data

Oct. 18, 2016    (JP) .................... 2016-204433

(51) Int. Cl.
    *G01B 11/14*    (2006.01)
    *G01S 17/89*    (2020.01)
    (Continued)

(52) U.S. Cl.
    CPC .............. *G01B 11/14* (2013.01); *G01S 7/497* (2013.01); *G01S 17/36* (2013.01); *G01S 17/89* (2013.01);
    (Continued)

(58) Field of Classification Search
    CPC ... G01B 11/14; G01B 2210/306; G01S 7/497; G01S 17/936; G01S 17/36; G01S 17/89; G06T 7/521; G06T 15/005
    See application file for complete search history.

(56) References Cited

U.S. PATENT DOCUMENTS

2015/0153169 A1*  6/2015  Cani ................... G01B 21/16
                                                          702/150
2016/0370460 A1   12/2016  Takahashi et al.
                  (Continued)

FOREIGN PATENT DOCUMENTS

JP          2006-337309          12/2006
JP          2009-079987          4/2009
                  (Continued)

OTHER PUBLICATIONS

U.S. Appl. No. 15/447,973, filed Mar. 2, 2017 Shu Takahashi, et al.

*Primary Examiner* — Hwa Andrew Lee
(74) *Attorney, Agent, or Firm* — Xsensus LLP

(57) ABSTRACT

A distance-measuring apparatus and a distance-measuring method. The distance-measuring apparatus and the distance-measuring method include emitting pulsed light, receiving and photoelectrically converting the pulsed light emitted and reflected by an object into a plurality of electrical signals, sorting the electrical signals into a plurality of phase signals, storing data including the phase signals or a value that is based on the phase signals, determining whether or not a dynamic change is present in the object, based on the data of a current frame and at least one past frame, and calculating distance to the object using the data, according to a result of determination made by the determining. When determined that the dynamic change is not present, moving average calculations are performed on the data of at least two of the current frame and a plurality of frames including the at least one past frame.

13 Claims, 14 Drawing Sheets

(51) Int. Cl.
    *G01S 17/36*     (2006.01)
    *G01S 7/497*     (2006.01)
    *G01S 17/931*    (2020.01)
    *G06T 7/521*     (2017.01)
    *G06T 15/00*     (2011.01)

(52) U.S. Cl.
    CPC ............ *G01S 17/931* (2020.01); *G06T 7/521* (2017.01); *G06T 15/005* (2013.01); *G01B 2210/306* (2013.01)

(56) References Cited

U.S. PATENT DOCUMENTS

| | | |
|---|---|---|
| 2017/0199271 A1 | 7/2017 | Nihei et al. |
| 2017/0212224 A1 | 7/2017 | Itoh et al. |

FOREIGN PATENT DOCUMENTS

| | | |
|---|---|---|
| JP | 2010-286488 | 12/2010 |
| JP | 2016-008875 | 1/2016 |
| JP | 2017-015611 | 1/2017 |
| JP | 2017-116314 | 6/2017 |
| JP | 2017-125829 | 7/2017 |
| JP | 2017-133853 | 8/2017 |

* cited by examiner

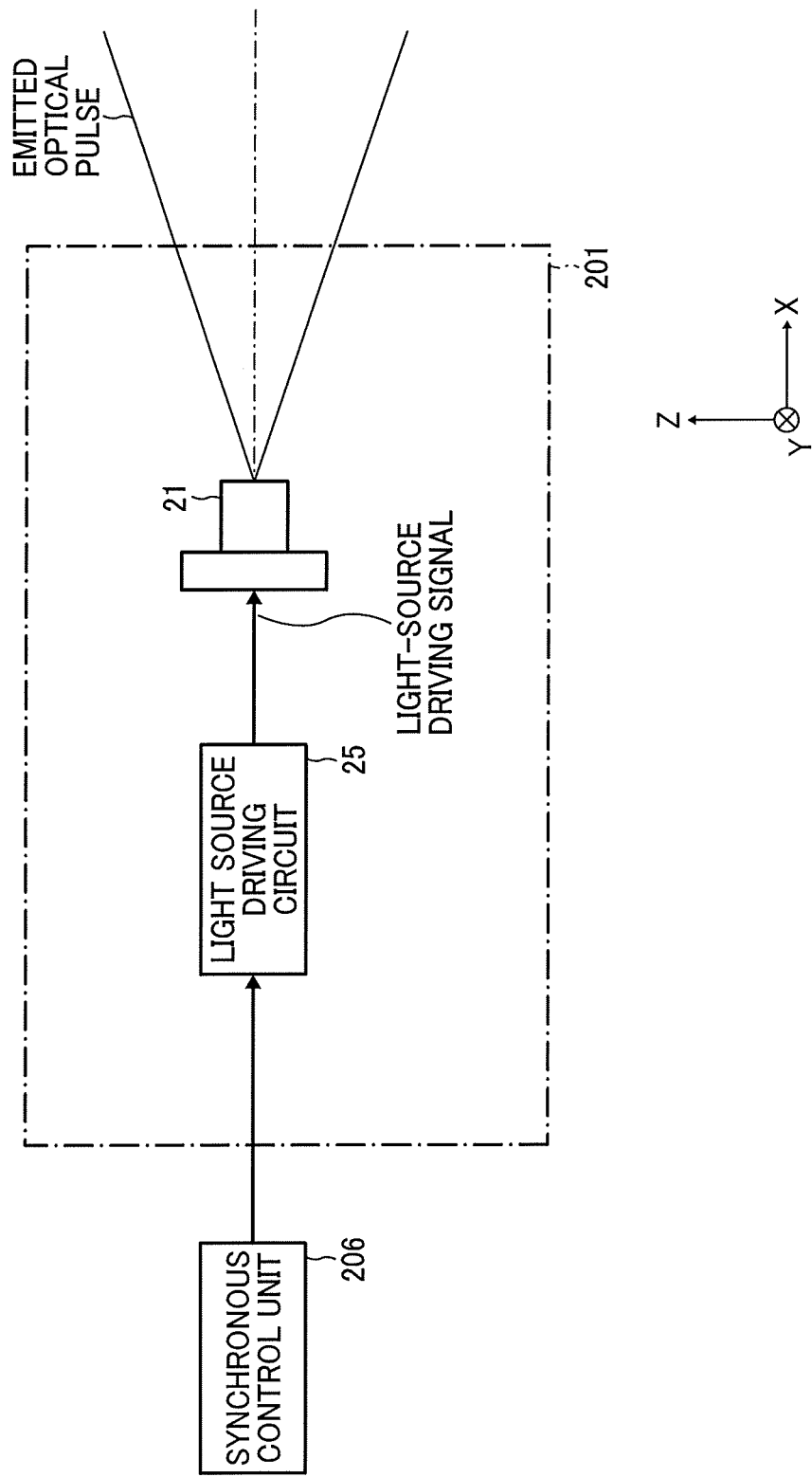

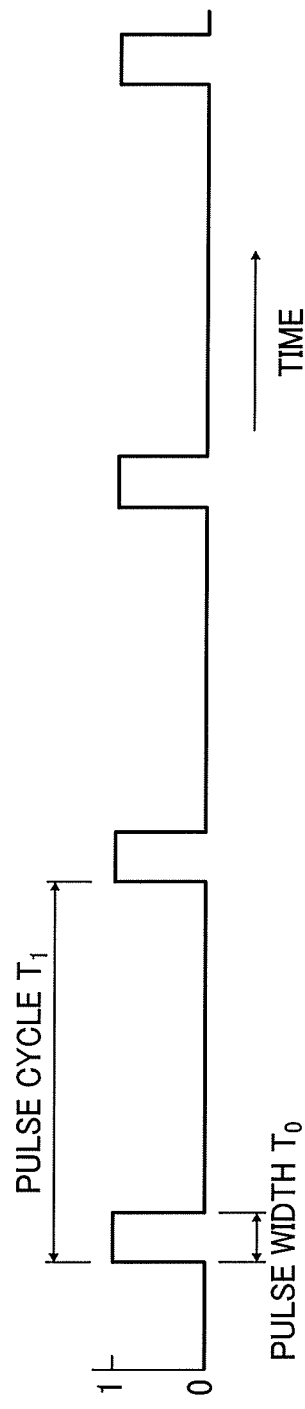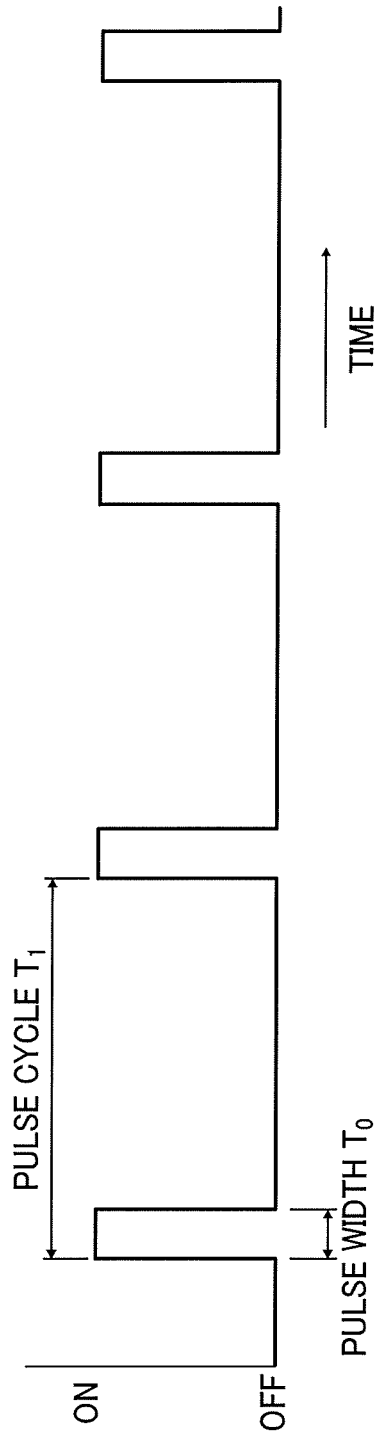

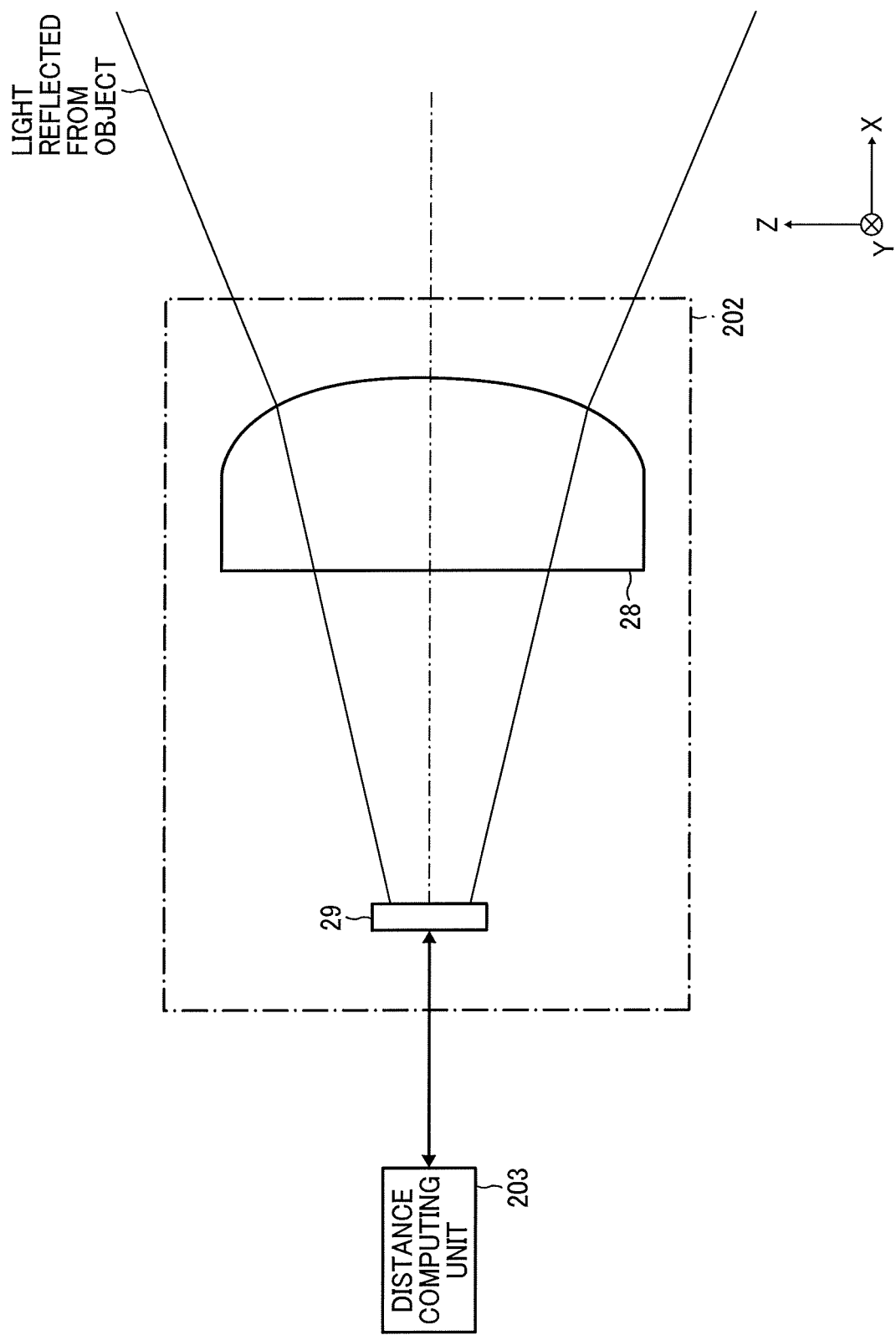

DISTANCE-MEASURING APPARATUS WHICH USES DIFFERENT CALCULATIONS DEPENDING ON WHETHER THE OBJECT IS DYNAMICALLY CHANGING

CROSS-REFERENCE TO RELATED APPLICATION

This patent application is based on and claims priority pursuant to 35 U.S.C. § 119(a) to Japanese Patent Application No. 2016-204433, filed on Oct. 18, 2016, in the Japan Patent Office, the entire disclosure of which is hereby incorporated by reference herein.

BACKGROUND

Technical Field

Embodiments of the present disclosure relate to a distance-measuring apparatus, a surveillance camera, a three-dimensional measuring device, a mobile object, a robot, and a distance-measuring method.

Background Art

Currently, distance measuring technologies to measure the distance to an object are actively developed.

For example, distance measuring technologies using so-called time-of-flight (TOF) computation are known in the art in which the distance to an object is calculated based on the time it takes for the light to be emitted, reflected by the object, and return.

SUMMARY

Embodiments of the present disclosure described herein provide a distance-measuring apparatus and a distance-measuring method. The distance-measuring apparatus and the distance-measuring method include emitting pulsed light, receiving and photoelectrically converting the pulsed light emitted and reflected by an object into a plurality of electrical signals, sorting the plurality of electrical signals into a plurality of phase signals, storing data including the plurality of phase signals or a value that is based on the plurality of phase signals, determining whether or not a dynamic change is present in the object, based on the data of a current frame and at least one past frame, and calculating distance to the object using the data, according to a result of determination made by the determining. When the determining determines that the dynamic change is not present, the calculating includes performing moving average calculations on the data of at least two of the current frame and a plurality of frames including the at least one past frame, and obtaining the distance from a result of the moving average calculations. When the determining determines that the dynamic change is present, the at least one past frame comprises a plurality of past frames, and the calculating includes performing the moving average calculations on the data of the plurality of past frames and obtaining the distance from a result of the moving average calculations. Alternatively, when the determining determines that the dynamic change is present, the calculating includes obtaining the distance from the data of the current frame or a future frame.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 4 is a diagram illustrating a phototransmitter system according to an embodiment of the present disclosure.

FIG. 5 is a diagram illustrating a pulse control signal according to an embodiment of the present disclosure.

FIG. 6 is a diagram illustrating a light-source driving signal according to an embodiment of the present disclosure.

FIG. 7 is a diagram illustrating a photoreceptor system according to an embodiment of the present disclosure.

Figure 1:
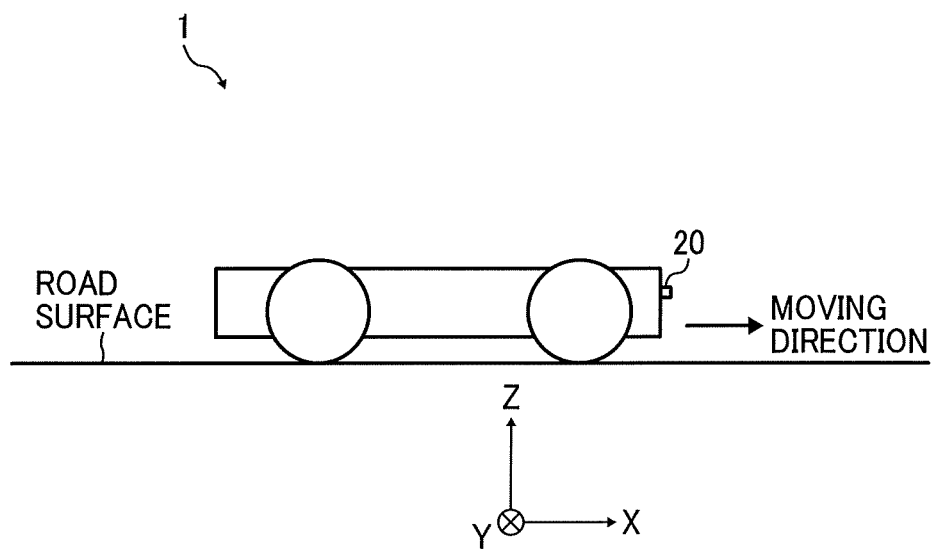
FIG. 1 is a diagram illustrating an external appearance of a vehicle for which a distance sensor is provided, according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the accompanying drawings.

FIG. 1 is a diagram illustrating an external appearance of a vehicle 1 for which a distance sensor 20 is provided, according to an embodiment of the present disclosure.

Note that the distance sensor 20 in FIG. 1 serves as a distance-measuring apparatus, and the vehicle 1 is used to carry baggage to a destination without humans in attendance. In the XYZ three-dimensional rectangular coordinate system of the present disclosure, it is assumed that the direction orthogonal to the road surface is the Z-axis direction, and that the directions of travel of the vehicle 1 is the +X-direction.

In the present embodiment, the distance sensor 20 is attached to the front of the vehicle 1, and obtains the three-dimensional data on the +X side of the vehicle 1. In other words, the distance sensor 20 obtains the three-dimensional data of an area ahead of the vehicle 1. Note also that the area that can be measured by the distance sensor 20 may be referred to as a measurable area.

Figure 2:
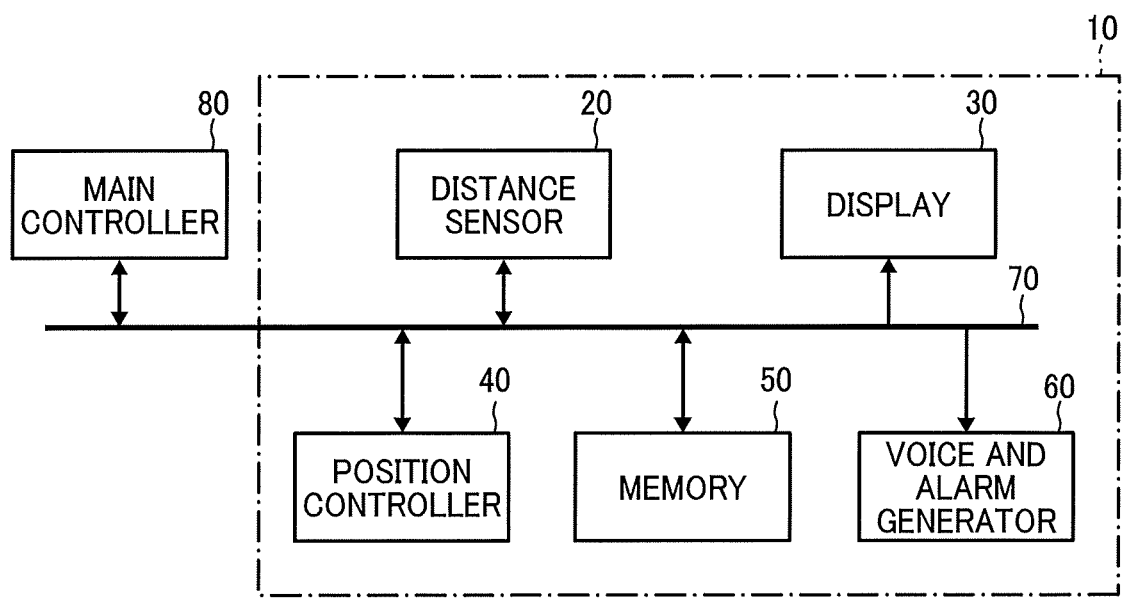
FIG. 2 is a schematic block diagram illustrating a configuration of a traveling control device, according to an embodiment of the present disclosure.

FIG. 2 is a schematic block diagram illustrating a configuration of a traveling control device 10, according to the present embodiment.

As illustrated in FIG. 2, for example, a display 30, a position controller 40, a memory 50, and a voice and alarm generator 60 are provided inside the vehicle 1. These elements are electrically connected to each other through a bus 70 through which data can be transmitted.

In the present embodiment, the traveling control device 10 includes a distance sensor 20, the display 30, the position controller 40, the memory 50, and the voice and alarm generator 60. In other words, the traveling control device 10 is fitted to the vehicle 1. Moreover, the traveling control device 10 is electrically connected to a main controller 80 of the vehicle 1.

Figure 3:
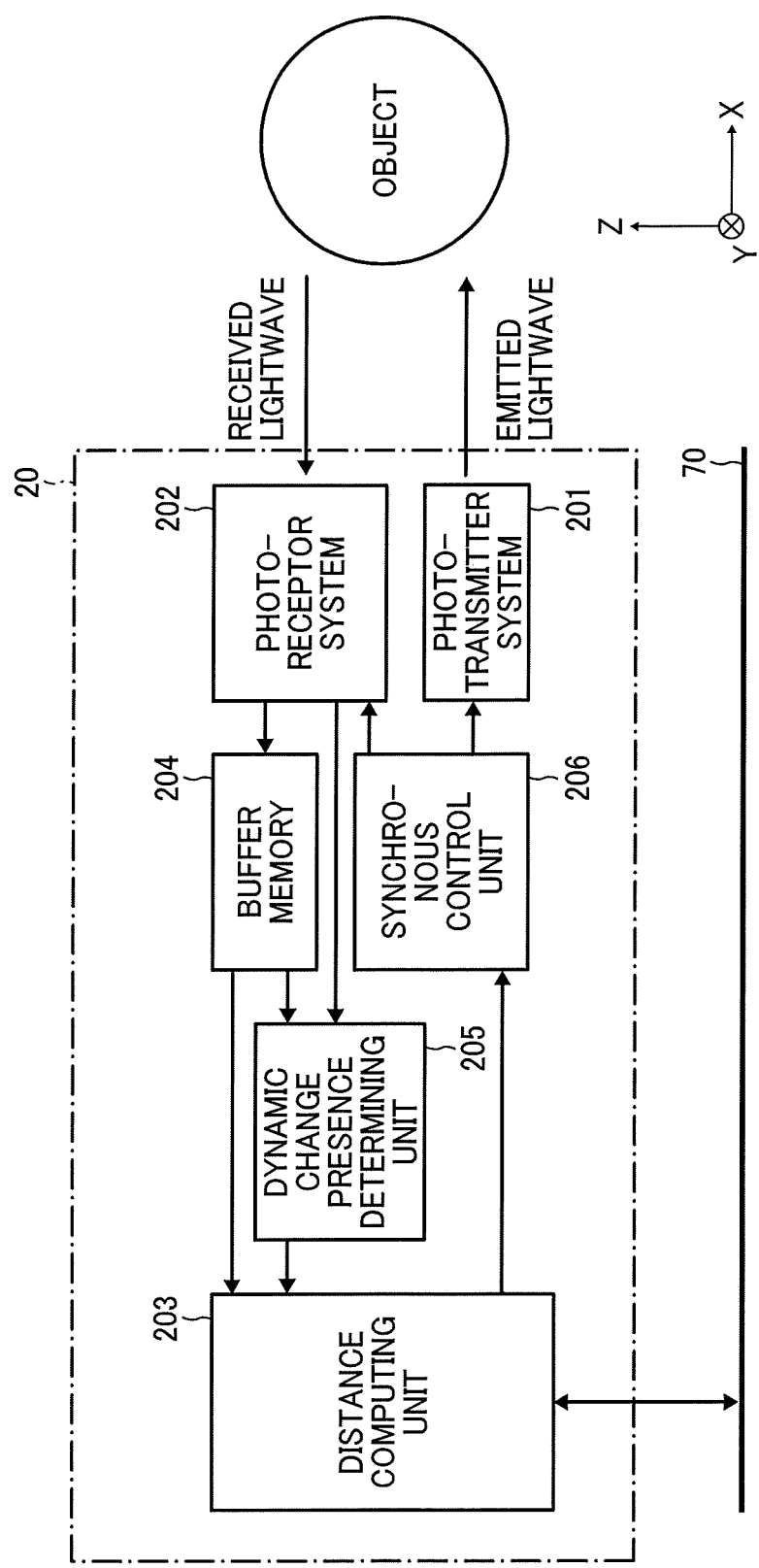
FIG. 3 is a diagram illustrating a configuration of a distance sensor, according to an embodiment of the present disclosure.

FIG. 3 is a diagram illustrating a configuration of the distance sensor 20, according to the present embodiment.

As illustrated in FIG. 3, the distance sensor 20 includes, for example, a phototransmitter system 201, a photoreceptor system 202, a distance computing unit 203, a buffer memory 204, a dynamic change presence determining unit 205, and a synchronous control unit 206. These elements are accommodated in a housing of distance sensor 20. The housing of the distance sensor 20 has a window through which the light emitted from the phototransmitter system 201 and the light reflected by an object and heading for the photoreceptor system 202 pass through, and a glass is fitted to the window.

FIG. 4 is a diagram illustrating the phototransmitter system 201 according to the present embodiment.

In the present embodiment, the phototransmitter system 201 is arranged on the −Z side of the photoreceptor system 202. As illustrated in FIG. 4, the phototransmitter system 201 includes, for example, a light source 21 and a light source driving circuit 25.

The light source 21 is turned on or turned off by the light source driving circuit 25. In the present embodiment, a light-emitting diode (LED) is used as the light source 21. However, no limitation is intended thereby, and for example, another kind of light source such as a semiconductor laser (end-surface emitting laser or surface-emitting laser) may be adopted. In the present embodiment, the light source 21 is arranged so as to emit light in the +X-direction. In the following description, a signal that is generated by the light source driving circuit 25 to drive the light source 21 is referred to as a light-source driving signal.

FIG. 5 is a diagram illustrating a pulse control signal according to the present embodiment.

FIG. 6 is a diagram illustrating a light-source driving signal according to the present embodiment.

The light source driving circuit 25 generates a light-source driving signal (see FIG. 6) based on a pulse control signal (i.e., a pulse signal of a pulse width $T_0$ and a pulse cycle $T_1$) (see FIG. 5) sent from the synchronous control unit 206. The light-source driving signal is sent to the light source 21. Note that the light-source driving signal may also be referred to as a driving pulse in the following description.

Due to this configuration, the light source 21 emits the pulsed light of the pulse width and pulse cycle specified by the synchronous control unit 206. Note that the pulsed light that is emitted from the light source 21 is set by the synchronous control unit 206 such that the duty of the pulsed light will be equal to or less than 50%. Note also that the pulsed light that is emitted from the light source 21 may be referred to as an emitted lightwave or an emitted optical pulse in the following description.

When the vehicle 1 is driven to move, the main controller 80 of the vehicle 1 sends a request to start position control to the position controller 40. Then, when the vehicle 1 reaches its destination, the main controller 80 of the vehicle 1 sends a request to terminate the position control to the position controller 40.

Upon receiving the request to start the position control or the request to terminate the position control, the position controller 40 sends these requests to the distance computing unit 203.

Some of the light that is emitted from the distance sensor 20 and is reflected by an object returns to the distance sensor 20. In the following description, the light that is reflected by the object and returns to the distance sensor 20 may be referred to as "light reflected from an object", for purposes of simplification.

FIG. 7 is a diagram illustrating the photoreceptor system 202 according to the present embodiment.

The photoreceptor system 202 detects the light reflected from an object. As illustrated in FIG. 7, the photoreceptor system 202 according to the present embodiment includes, for example, an image forming optical system 28 and an image sensor 29.

The image forming optical system 28 is disposed in the optical path of the light reflected from an object, and concentrates the light. In the present embodiment, the image forming optical system 28 consists of only one lens. However, in some embodiments, the image forming optical system 28 may include two lenses, or three or more lenses. Alternatively, in some embodiments, a mirror optical system may be employed for the image forming optical system 28.

The image sensor 29 receives the light reflected from an object through the image forming optical system 28. In the present embodiment, an area image sensor where a plurality of photoreceptors such as photodiodes and phototransistors are two-dimensionally arranged is used as the image sensor 29. In the following description, the light that is reflected from an object and then is received by the image sensor 29 may be referred to as a received lightwave or a received optical pulse. Note also that the photoreceptors of the image sensor 29 may be referred to as pixels.

Figure 8:
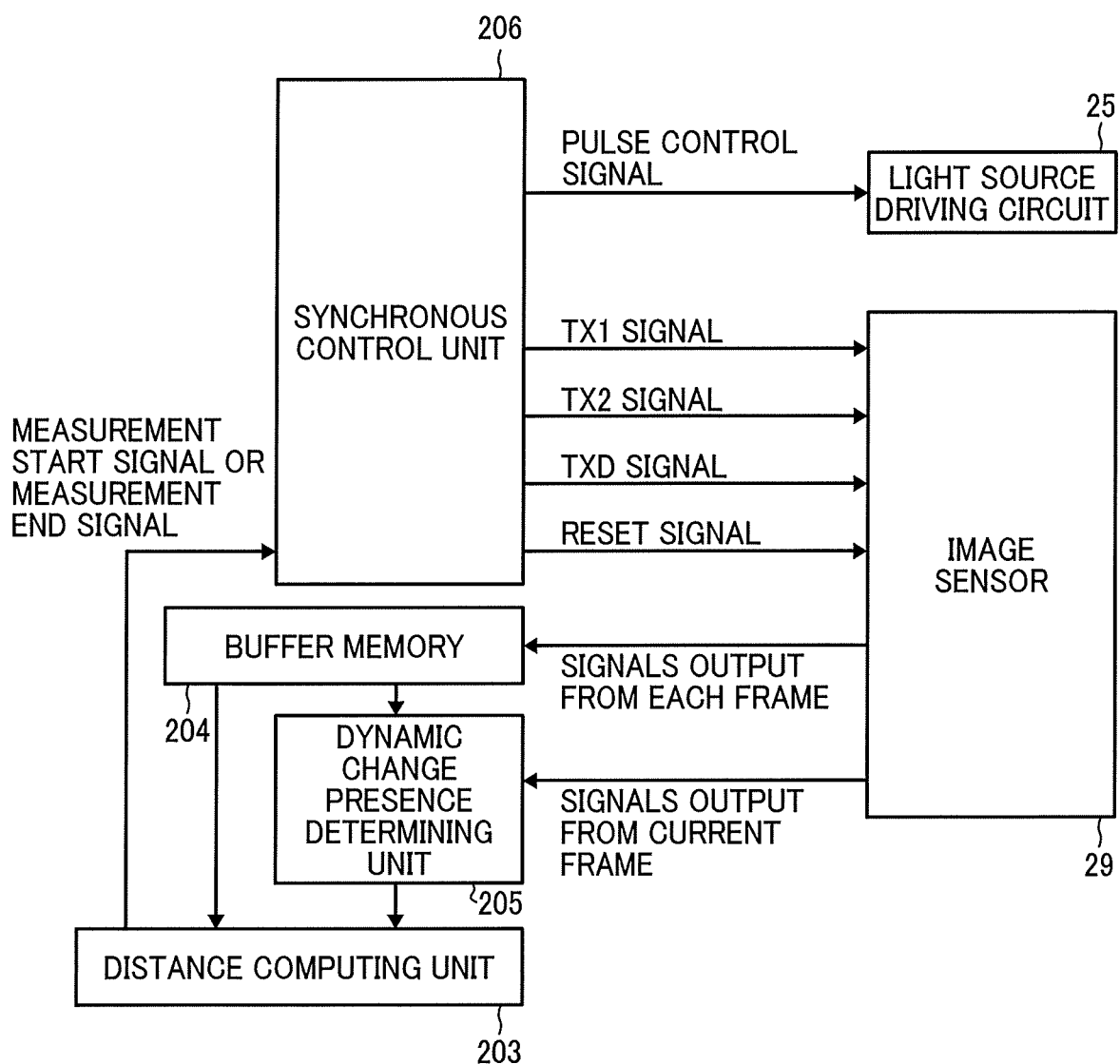
FIG. 8 is a diagram illustrating the flow of signals in a distance sensor, according to an embodiment of the present disclosure.

FIG. 8 is a diagram illustrating the flow of signals in the distance sensor 20, according to the present embodiment.

The image sensor 29 photoelectrically converts the received light into a plurality of electrical signals on a pixel-by-pixel basis, and temporally divides the obtained electrical signals (detected light signals) and sorts the divided electrical signals into a plurality of phase signals on a temporal basis.

More specifically, the image sensor 29 is provided with two charge storage units for every photoreceptor, and when a TX1 signal (see FIG. 8) is at a high level, the signal charge that is photoelectrically converted at the photoreceptor is accumulated in one charge storage unit. Alternatively, when a TX2 signal (see FIG. 8) is at a high level, the signal charge that is photoelectrically converted at the photoreceptor is accumulated in another charge storage unit. Moreover, the image sensor 29 does not accumulate electrical charge when a TXD signal (see FIG. 8) is at a high level, and when a reset signal (see FIG. 8) is at a high level, resets the amount of electric charge accumulated in the two charge storage units to "0".

In the buffer memory 204, output signals (i.e., a plurality of phase signals) that are output from the image sensor 29 on a frame-by-frame basis are temporarily stored. The buffer memory 204 includes a plurality of storage areas.

The dynamic change presence determining unit 205 determines whether there is any dynamic change (movement or deformation) in an object on a pixel-by-pixel basis based on the output signals (i.e., a plurality of phase signals) that are output from the current frame of the image sensor 29 and the output signals (i.e., a plurality of phase signals) that are output from the past frames (i.e., the chronologically preceding frames than the current frame) of the image sensor 29 and stored in the buffer memory 204, and outputs the result of determination to the distance computing unit 203. Here, the expression "determining whether there is any dynamic change in an object on a pixel-by-pixel basis" indicates determining, on a pixel-by-pixel basis, whether there is any dynamic change in an at least one object captured by the image sensor 29.

According to the result of determination made by the dynamic change presence determining unit 205, the distance computing unit 203 uses the output signals (i.e., a plurality of phase signals) output from the image sensor 29, and calculates, for each pixel of the image sensor 29, the time difference (delay time) between the timing at which the light source 21 emits light (i.e., the timing at which the emitted lightwave is output) and the timing at which the image sensor 29 receives light (i.e., the timing at which the received lightwave is input). Then, the distance computing unit 203 calculates the distance to the object based on the calculated time difference and generates a distance image (depth map) that is three-dimensional data of at least one object, and outputs the generated distance image to the position controller 40.

As illustrated in FIG. 8, once a measurement start signal is received from the distance computing unit 203, the synchronous control unit 206 outputs a pulse control signal to the light source driving circuit 25, and outputs a TX1 signal, a TX2 signal, a TXD signal, and a reset signal to the image sensor 29 on a selective manner. Once a measurement end signal is received from the distance computing unit 203, the synchronous control unit 206 stops outputting these signals as above.

As illustrated in FIG. 2, once a distance image is received from the distance computing unit 203, the position controller 40 displays the received distance image on the display 30.

Moreover, the position controller 40 performs position control based on the distance image such that the position of the vehicle 1 is at a predetermined position.

Figure 9:
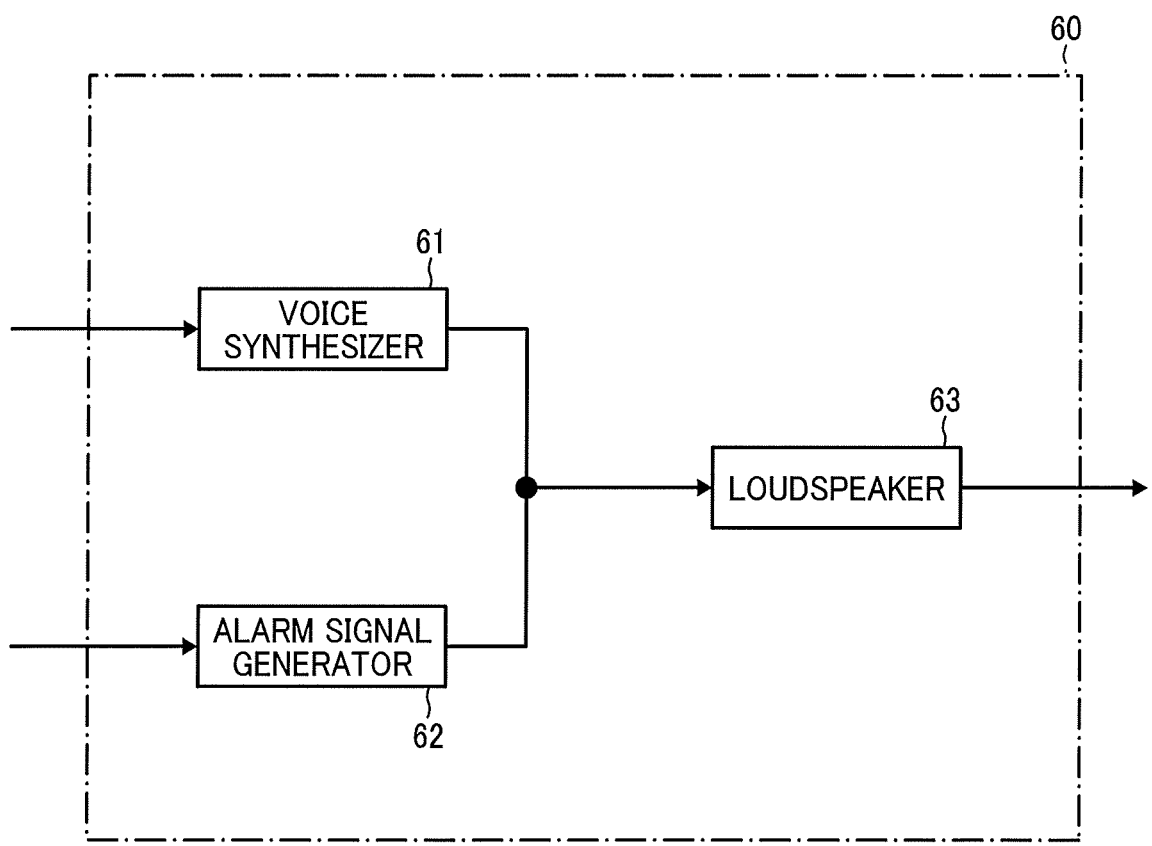
FIG. 9 is a block diagram illustrating a configuration of a voice and alarm generator, according to an embodiment of the present disclosure.

FIG. 9 is a block diagram illustrating a configuration of the voice and alarm generator 60, according to the present embodiment.

As illustrated in FIG. 9, the voice and alarm generator 60 according to the present embodiment includes, for example, a voice synthesizer 61, an alarm signal generator 62, and a loudspeaker 63.

The voice synthesizer 61 has a plurality of pieces of voice data, and when the presence of danger is notified by the position controller 40, the voice synthesizer 61 selects the corresponding piece of voice data and outputs the selected piece of voice data to the loudspeaker 63.

When the presence of danger is notified by the position controller 40, the alarm signal generator 62 generates the corresponding alarm signal and outputs the selected alarm signal to the loudspeaker 63.

For example, the distance sensor 20 according to the present embodiment measures distances using time-of-flight (TOF) methods such as the sinusoidal modulation technique and the rectangular modulation technique.

In the sinusoidal modulation technique, a received lightwave is detected upon being temporally divided into three or more lightwaves, and a delay time Td of the timing at which the received lightwave is input with reference to the timing at which the emitted lightwave is output is obtained, using the obtained phase signals, in the computation of a phase difference angle.

By way of example, a method of computing a phase difference using the four-phase sinusoidal modulation technique is described with reference to FIG. 10.

Figure 10:
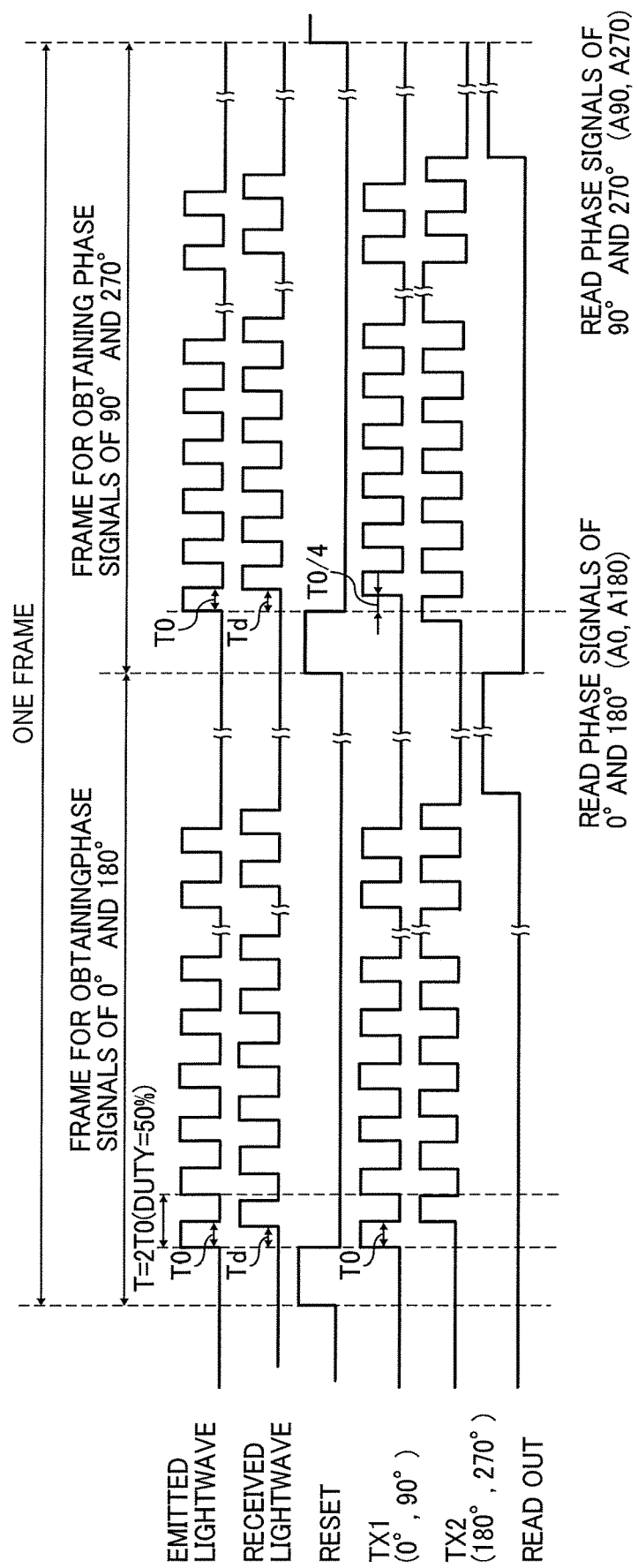
FIG. 10 is a timing chart illustrating one frame of four-phase sinusoidal modulation technique, according to an embodiment of the present disclosure.

FIG. 10 is a timing chart illustrating one frame of four-phase sinusoidal modulation technique, according to the present embodiment.

In FIG. 10, an emitted lightwave based on a pulse control signal and a TX1 (0°) signal are output in a synchronous manner. Due to the one-frame structure illustrated in FIG. 10, a received optical pulse is divided into four phases of 0°, 90°, 180°, and 270°, and phase signals (A0, A90, A180, A270) are obtained. Then, a phase difference angle Φ is obtained using formula (1) given below.

$$\Phi = \arctan\{(A90-A270)/(A0-A180)\} \quad (1)$$

A delay time Td can be obtained by formula (2) given below using phase difference angle Φ.

$$Td = \Phi/2\pi \times T \quad (2)$$

(T=2T0, T0: pulse width of driving pulse)

In such a method of computing a phase difference as above, an optimal waveform of emitted lightwave that enhances the performance of distance measuring is a sinusoidal waveform. Accordingly, in the sinusoidal modulation technique, as the name indicates so, the light source is driven using a sinusoidal modulating signal (driving pulse).

By contrast, in the rectangular modulation technique, a received lightwave is detected upon being temporally divided into two or more lightwaves, and a delay time Td' of the timing at which the received lightwave is input with reference to the timing at which the emitted lightwave is output is obtained, using the obtained phase signals.

By way of example, a method of computing a phase difference using the two-phase rectangular modulation technique is described with reference to FIG. 11.

Figure 11:
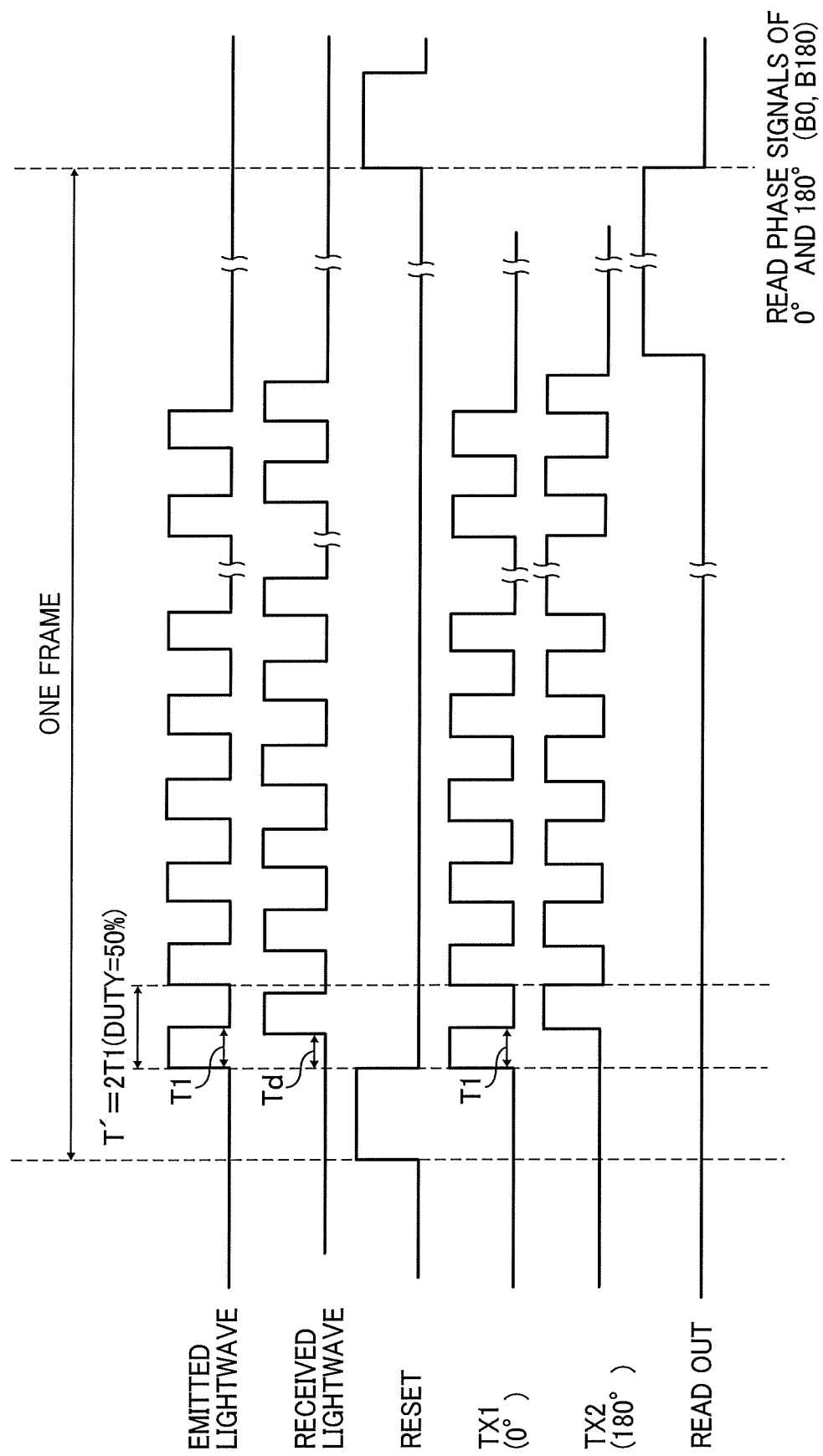
FIG. 11 is a timing chart illustrating one frame of two-phase rectangular modulation technique, according to an embodiment of the present disclosure.

FIG. 11 is a timing chart illustrating one frame of two-phase rectangular modulation technique, according to the present embodiment.

Also in FIG. 11, an emitted lightwave based on a pulse control signal and a TX1 (0°) signal are output in a synchronous manner. Due to the one-frame structure illustrated in FIG. 11, a received optical pulse is divided into two phases of 0° and 180°, and phase signals (B0, B180) are obtained. A delay time Td' can be obtained by formula (3) given below.

$$Td' = \{B180/(B0+B180)\} \quad (3)$$

(T1: pulse width of driving pulse)

In such a method of computing a phase difference as above, an optimal waveform of emitted lightwave that enhances the performance of distance measuring is a rectangular waveform. Accordingly, in the rectangular modulation technique, as the name indicates so, the light source is driven using a rectangular wave modulating signal (driving pulse).

Next, the first distance measuring processes that are performed using the distance sensor 20 are described with reference to the flowchart of FIG. 12.

Figure 12:
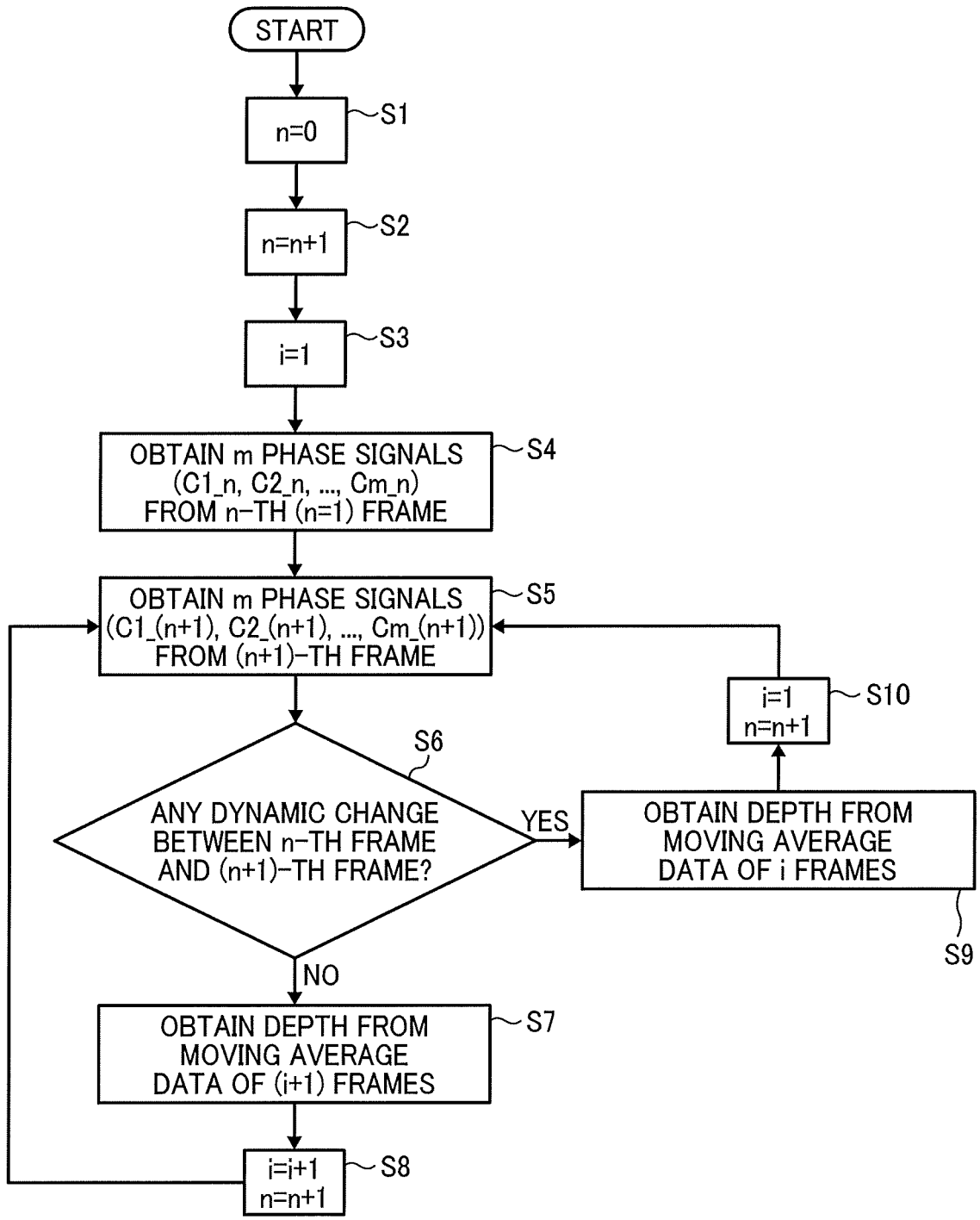
FIG. 12 is a flowchart of the first distance measuring processes, according to an embodiment of the present disclosure.

FIG. 12 is a flowchart of the first distance measuring processes according to the present embodiment.

The first distance measuring processes are performed for every pixel of the image sensor 29 under the same procedure.

In a first step S1, "0" is set to a counter n. The counter n indicates the number of frames since the capturing started.

In a subsequent step S2, the counter n is updated.

In a subsequent step S3, "1" is set to a counter i. The counter i indicates the number of times a moving average is obtained from a pixels to be measured. Unless otherwise specified, the term "moving average" the present disclosure indicates a simple moving average.

In a subsequent step S4, m phase signals (C1_n, C2_n, . . . , Cm_n) are obtained from n-th (n=1) frame (i.e., the first frame). These phase signals are stored in the buffer memory 204.

In a subsequent step S5, m phase signals (C1_(n+1), C2_(n+1), . . . , Cm_(n+1)) are obtained from (n+1)-th frame (i.e., the current frame). These phase signals are stored in the buffer memory 204. Hereinafter, the frame immediately preceding the current frame may be referred to as a previous frame.

In a subsequent step S6, whether or not there is dynamic change in pixels to be measured between n-th frame (previous frame) and (n+1)-th frame (current frame) is determined. In other words, whether or not there is a dynamic change is determined in the object area that corresponds to the pixels to be measured. In particular, the amounts of signal (i.e., the amount of electric charge) are compared with each other between a phase signal Ck_n (1≤k≤m) that is obtained from n-th frame and a phase signal Ck_(n+1) (1≤k≤m) that is obtained from (n+1)-th frame. More specifically, when the difference in the amount of signal between Ck_n and Ck_(n+1), where k takes at least one value, is greater than a predetermined threshold, it is determined that a dynamic change is present. When the difference is equal to or less than the threshold, it is determined that a dynamic change is not present. When the result of determination is negative in the step S6, the processing shifts to the step S7, and when the result of determination is positive in the step S6, the processing shifts to a step S9.

In a step S7, depth value (distance value) in an object area is calculated and obtained using the moving average data that is obtained by performing the moving average calculations on the phase signals of (i+1) frames up to the current frame, and the formula (1) and the formula (2) as above or the formula (3) as above. For example, when the sinusoidal modulation technique is adopted, a depth value is calculated and obtained using the moving average data $MAD_{A0}$, $MAD_{A90}$, $MAD_{A180}$, and $MAD_{A270}$ that are obtained by performing the moving average calculations on each of the phase signals A0, A90, A180, and A270 of (i+1) frames up to the current frame, and the formula (1) and the formula (2) as above. In so doing, the phase signals in the formula (1) and the formula (2) as above are replaced with the corresponding moving average data. For example, when the rectangular wave modulation technique is adopted, a depth value is calculated and obtained using the moving average data $MAD_{B0}$ and $MAD_{B180}$ that are obtained by performing the moving average calculations on each of the phase signals B0 and B180 of (i+1) frames up to the current frame, and the formula (3) as above. In so doing, the phase signals in the formula (3) as above are replaced with the corresponding moving average data.

In a subsequent step S8, the counters i and n are updated. Once the step S8 is performed, the processing returns to the step S5.

In a step S9, depth value (distance value) in an object area is calculated and obtained using the moving average data that is obtained by performing the moving average calculations on the phase signals of i frames up to the frame immediately preceding the current frame, and the formula (1) and the formula (2) as above or the formula (3) as above. In this configuration, latency of one frame occurs, but the distance measurement of an object can be continued. The reason why the distance measurement of an object can be continued are described later. For example, when the sinusoidal modulation technique is adopted, a depth value is calculated and obtained using the moving average data $MAD_{A0}'$, $MAD_{A90}'$, $MAD_{A180}'$, and $MAD_{270}'$ that are obtained by performing the moving average calculations on each of the phase signals A0, A90, A180, and A270 of i frames up to the frame immediately preceding the current frame, and the formula (1) and the formula (2) as above. In so doing, the phase signals in the formula (1) and the formula (2) as above are replaced with the corresponding moving average data. For example, when the rectangular wave modulation technique is adopted, a depth value is calculated and obtained using the moving average data $MAD_{B0}'$ and $MAD_{B180}'$ that are obtained by performing the moving average calculations on each of the phase signals B0 and B180 of i frames up to the frame immediately preceding the current frame, and the formula (3) as above. In so doing, the phase signals in the formula (3) as above are replaced with the corresponding moving average data.

In a subsequent step S10, the counter i is initialized and the counter n is updated. Once the step S10 is performed, the processing returns to the step S5.

The series of processes of FIG. 12 as described above are continuously performed until the measurement ends (until a measurement end signal is output from the distance computing unit 203 to the synchronous control unit 206). The measurement may end at any desired timing of the flowchart of FIG. 12.

In the step S6 as above, for example, it may be determined that a dynamic change is present when the difference in the amount of signal between Ck_n and Ck_(n+1) is greater than a threshold for the majority of k, and it may be determined that a dynamic change is not present when the difference is equal to or less than the threshold.

In the step S6 as above, for example, whether or not an a dynamic change is present may be determined by comparing with a predetermined threshold the difference between a depth value (distance value) calculated from a plurality of phase signals obtained from the current frame and a depth value (distance value) calculated from a plurality of phase signals obtained from the previous frame.

In the step S7 as above, the frames for which moving average calculations are to be performed do not necessarily have to include the current frame, and it is satisfactory as long as the frames include at least two of the current frame and a plurality of frames including at least one past frame.

In the step S9 as above, the frames for which moving average calculations are to be performed do not necessarily have to include the previous frame, and it is satisfactory as long as the frames include at least two past frames.

Here, the reason why the distance measurement of an object can be continued in the step S9, although latency of one frame occurs, is described.

Assuming that the timing at which an object started moving is T0, such a timing T0 exists between the timing at which the phase signal of n-th frame (i.e., the previous frame) is obtained (the timing of the step S4) and the timing at which the phase signal of (n+1)-th frame (i.e., the current frame) is obtained (the timing of the step S5). Under the assumption as above, for the pixels where a dynamic change is determined to be present, the distance that is calculated from the phase signals of the frames up to n-th frame (i.e. the frame immediately preceding the frame where an object started moving) is obtained as the distance to the object (step S9). Accordingly, the phase signal of latest (n+1)-th frame (i.e. the frame immediately after the frame where an object started moving) does not affect the distance to the object, and although latency of one frame occurs, the noise can be reduced by performing moving average calculations. Accordingly, the distance to the object can accurately be obtained. Moreover, as the distance immediately before an object started moving is calculated for the pixels where a dynamic change is determined to be present, almost no error occurs in distance measurement.

Further, cases in which whether or not a dynamic change is present is successively determined for the same pixel are described. For example, in the step S7, the phase signals of (n+1)-th frame obtained in the step S5 before going through a loop are stored in the buffer memory 204 in which the phase signal of n-th frame is stored in the previous step S4. Then, in the step S6, whether or not a dynamic change is present is determined using those phase signals of (n+1)-th frame obtained in the step S5 before going through a loop and the phase signals of (n+1)-th frame obtained in the step S5 after going through a loop. When it is determined in this step S6 that a dynamic change is present between the n-th frame and the (n+1)-th frame, the process shifts to the step S9, and the distance is calculated and obtained using only the phase signals obtained in the step S5 before going through a loop.

Next, the second distance measuring processes that are performed using the distance sensor 20 are described with reference to the flowchart of FIG. 13.

Figure 13:
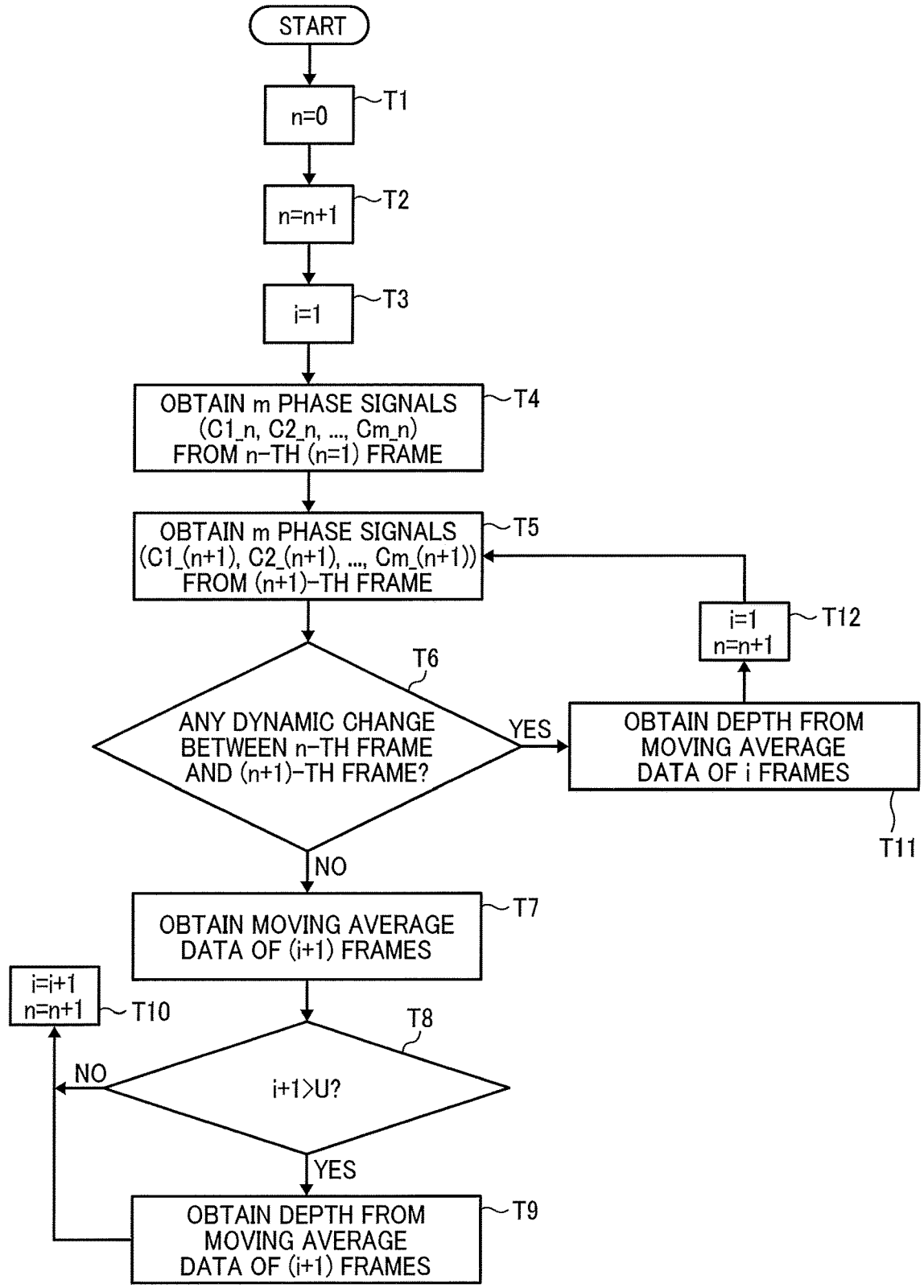
FIG. 13 is a flowchart of the second distance measuring processes, according to an embodiment of the present disclosure.

FIG. 13 is a flowchart of the second distance measuring processes according to the present embodiment.

The second distance measuring processes are performed for every pixel of the image sensor 29 under a similar procedure.

Steps T1 to T6, T11, and T12 in FIG. 13 are equivalent to the steps S1 to S6, S9, and S10 in FIG. 12, respectively. For this reason, steps T7 to T10 in FIG. 13 that are different from the steps in FIG. 12 are described below.

In the step T7, moving average data is obtained from an object area by performing the moving average calculations on the corresponding phase signals of (i+1) frames up to the current frame. Note that when moving average calculations have been performed on the corresponding phase signals of i frames up to the previous frame before the step T7, the moving average data may be updated using the results of such moving average calculations and the corresponding phase signals of the current frame.

In a step T8, whether or not "i+1>U" is determined. More specifically, whether the number of times (i+1) a moving average is obtained from the corresponding phase signals of the frames up to the current frame is greater than a predetermined acceptance value U (U≥1) for the number of times a moving average is obtained is determined. When the result of determination is positive in step T8, the processing shifts to the step T9, and when the result of determination is negative, the processing shifts to step T10.

In the step T9, depth value (distance value) is calculated and obtained using the moving average data obtained in the step T7, and the formula (1) and the formula (2) as above or the formula (3) as above.

In a subsequent step T10, each of the counters i and n is updated. Once the step T10 is performed, the processing returns to the step T5.

As described above, unless a dynamic change is detected in an object within an area to which light is emitted (i.e., a detection field) in the steps T7 to T10, only the moving average data that is obtained by a sufficient number of moving average calculations (where the number of times a moving average is obtained is "U" is obtained as a depth value. Accordingly, distances can be measured with a high degree of precision.

The series of processes of FIG. 13 as described above are continuously performed until the measurement ends (until a measurement end signal is output from the distance computing unit 203 to the synchronous control unit 206). The measurement may end at any desired timing of the flowchart of FIG. 13.

In the step T6 as above, for example, it may be determined that a dynamic change is present when the difference in the amount of signal of the corresponding phase signal between the current frame and the previous frame is greater than a threshold for the majority of k, and it may be determined that a dynamic change is not present when the difference is equal to or less than the threshold.

Alternatively, in the step T6 as above, whether or not an a dynamic change is present may be determined, for example, by comparing with a predetermined threshold the difference between a depth value (distance value) calculated from a plurality of phase signals obtained from the current frame and a depth value (distance value) calculated from a plurality of phase signals obtained from the frame immediately preceding the current frame.

Moreover, in the step T9 as above, the frames for which moving average calculations are to be performed do not necessarily have to include the current frame, and it is satisfactory as long as the frames include at least two of the current frame and a plurality of frames including at least one past frame.

In the step T11 as above, the frames for which moving average calculations are to be performed do not necessarily have to include the frame immediately preceding the current frame, and it is satisfactory as long as the frames include at least two past frames.

In FIG. 13, a step similar to the step T8 may be inserted between the step T6 and the step T11 as above.

Next, the third distance measuring processes that are performed using the distance sensor 20 are described with reference to the flowchart of FIG. 14.

Figure 14:
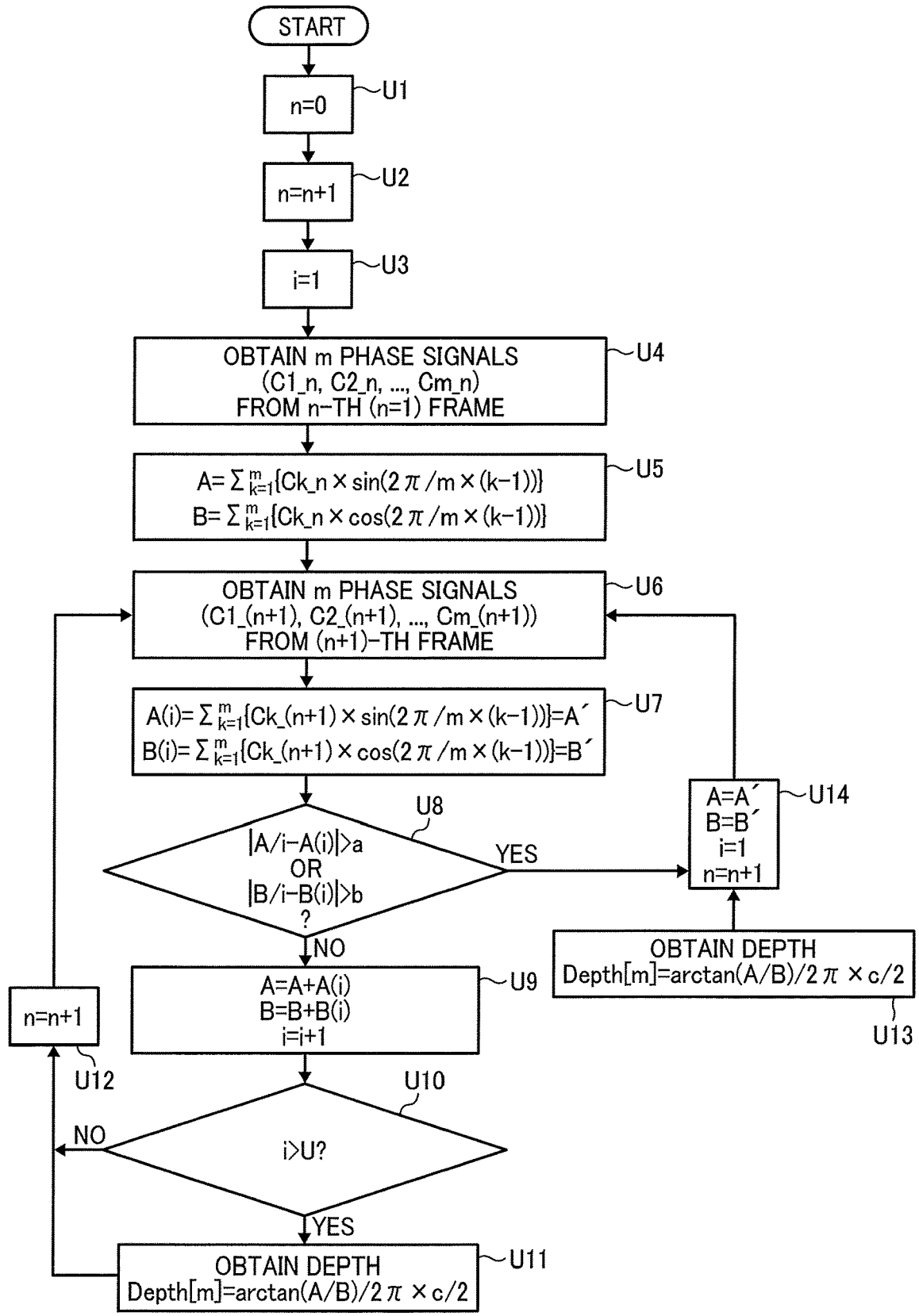
FIG. 14 is a flowchart of the third distance measuring processes, according to an embodiment of the present disclosure.

FIG. 14 is a flowchart of the third distance measuring processes according to the present embodiment.

The third distance measuring processes are performed for every pixel of the image sensor 29 under a similar procedure.

Steps U1 to U3 in FIG. 14 are equivalent to the steps S1 to S3 in FIG. 12, respectively.

In a step U4, one cycle ($2\pi$) that is determined by effective frequency $f_0$ is temporally divided into m cycles, and phase signals Ck_n (where $1 \leq k \leq m$) are obtained by dividing the output signals that are output from the pixels to be measured of n-th frame (n=1) (i.e., the first frame) of the image sensor 29 into m signals. For example, when m=4, phase signals where C1_n, C2_n, C3_n, and C4_n are 0°, 90°, 180°, and 270°, respectively, with reference to the timing of light emission of the light source 21 are obtained. Note that $m \geq 3$.

In a step U5, the phase differences between the timing of light emission and the timing of light reception are obtained as the sin component (A) and the cos component (B) using the phase signals obtained in the step U4 and formula (4) given below, and are stored in the storage areas $MA_A$ and $MA_B$ of the buffer memory 204, respectively.

$$A=\Sigma_{k=1}^{m}\{Ck\_n \times \sin(2\pi/m \times (k-1))\}$$

$$B=\Sigma_{k=1}^{m}\{Ck\_n \times \cos(2\pi/m \times (k-1))\} \quad (4)$$

In a subsequent step U6, output signals that are output from the pixels to be measured of (n+1)-th frame (i.e., the current frame) of the image sensor 29 are obtained. More specifically, phase signals Ck_(n+1) ($1 \leq k \leq m$) are obtained by temporally dividing one cycle ($2\pi$) that is determined by effective frequency $f_0$ into m cycles. For example, when m=4, phase signals where C1_n+1, C2_n+1, C3_n+1, and C4_n+1 are 0°, 90°, 180°, and 270°, respectively, with reference to the timing of light emission of the light source 21 are obtained. Note that $m \geq 3$.

In a subsequent step U7, the phase differences between the timing of light emission and the timing of light reception are obtained as the sin component A(i) and the cos component B(i) using the phase signals obtained in the step U6 and the above formula (4) where "n" has been replaced with "(n+1)". In the following description, the sin component (A), the cos component (B), the sin component A(i), and the cos component B(i) may collectively be referred to as phase difference components where appropriate.

In a subsequent step U8, whether or not there is a dynamic change is determined in the object area that corresponds to the pixels to be measured. In particular, the sin component A(i) and the cos component B(i) of the current frame, and the absolute values (|A/i−A(i)|, |B/i−B(i)|) of the differences between the average values (A/i, B/i) of the sin components and the cos components of the frames up to the frame immediately preceding the current frame are compared with predetermined thresholds (a, b), respectively. Then, when at least one of these absolute values of differences exceeds the relevant one of the thresholds, the result of determination is positive in the step U8, and the processing shifts to a step U13. On the other hand, when all of these absolute values of differences are equal to or less than the thresholds, the result of determination is negative in the step U8, and the processing shifts to a step U9. In this configuration, the thresholds (a, b) may be set by a user, or may automatically be set in the adjustment steps of the production of the distance sensor 20 based on the characteristic value of the sensor. In order to be distinguished from the fluctuations in shot noise, the thresholds (a, b) may be determined, for example, by an approximate function that depends on the amount of signal, in view of the shot noise characteristics of the sensor that are obtained in advance.

In the step U9, the sin component (A(i)) and the cos component (B(i)) of the current frame are added to the storage areas $MA_A$ and $MA_B$ of the buffer memory 204, respectively, and the counter i is updated.

In a step U10, whether or not "i>U" is determined. More specifically, whether the number of times (i) a moving average is obtained from the corresponding phase signals of the frames up to the current frame is greater than a predetermined acceptance value U ($U \geq 1$) for the number of times a moving average is obtained is determined. When the result of determination is positive in the step U10, the processing shifts to the step U11, and when the result of determination is negative, the processing shifts to a step U12.

In a step U11, a depth value is calculated and obtained using the moving average data of the sin components and the moving average data of the cos components of the frames up to the current frame, and formula (5) given below. In other words, the distance (depth) is computed using the data of the frames up to the current frame where it is determined that no dynamic change is present.

$$\text{Depth}[m]=\arctan(A/B)/2\pi \times (C/2) \quad (5)$$

In the above formula (5), "c" indicates the speed of light ($\approx 3e8$ [m/s]).

In the present embodiment, "A/B" in the above formula (5) indicates the ratio of the moving average data of the sin components of the frames up to the current frame to the moving average data of the cos components up to the current frame.

In a step U13, a depth value is calculated and obtained using the moving average data of the sin components and the moving average data of the cos components of the frames up to the frame immediately preceding the current frame, and formula (5) as above. In other words, in this configuration, the distance (depth) is computed using the data of the frames up to the frame immediately preceding the current frame where it is determined that a dynamic change is present. Accordingly, latency of one frame occurs. In the above formula (5), "c" indicates the speed of light ($\approx 3e8$ [m/s]). In the present embodiment, "A/B" in the above formula (5) indicates the ratio of the moving average data of the sin components of the frames up to the frame immediately preceding the current frame to the moving average data of the cos components up to the frame immediately preceding the current frame.

In a step U14, the storage areas $MA_A$ and $MA_B$ of the buffer memory 204 are updated with only the data (A'=A(i), B'=B(i)) of the latest frame (i.e., (n+1)-th frame) at that point in time, and the counter i is initialized and the counter n is updated. Once the step U14 is performed, the processing returns to the step U6.

In the step U8 of FIG. 14, whether or not a dynamic change is present is determined by calculating the difference between the average value of phase difference components of a plurality of frames (a plurality of past frames) preceding the current frame and the phase difference components of the current frame. However, no limitation is intended thereby. For example, whether or not a dynamic change is present may be determined according to the difference between the phase difference components of some successive frames.

Moreover, there are multiple alternative indices apart from the difference as above. For example, whether or not a dynamic change is present may be determined using the derivative value (inclination) of changes in the phase difference components or changes in such a derivative value.

The series of processes of FIG. 14 as described above are continuously performed until the measurement ends (until a measurement end signal is output from the distance computing unit 203 to the synchronous control unit 206). The measurement may end at any desired timing of the flowchart of FIG. 14.

In FIG. 14, a step similar to the step U10 may be inserted between the step U8 and the step U13 as above.

Next, the fourth distance measuring processes that are performed using the distance sensor 20 are described with reference to the flowchart of FIG. 15.

Figure 15:
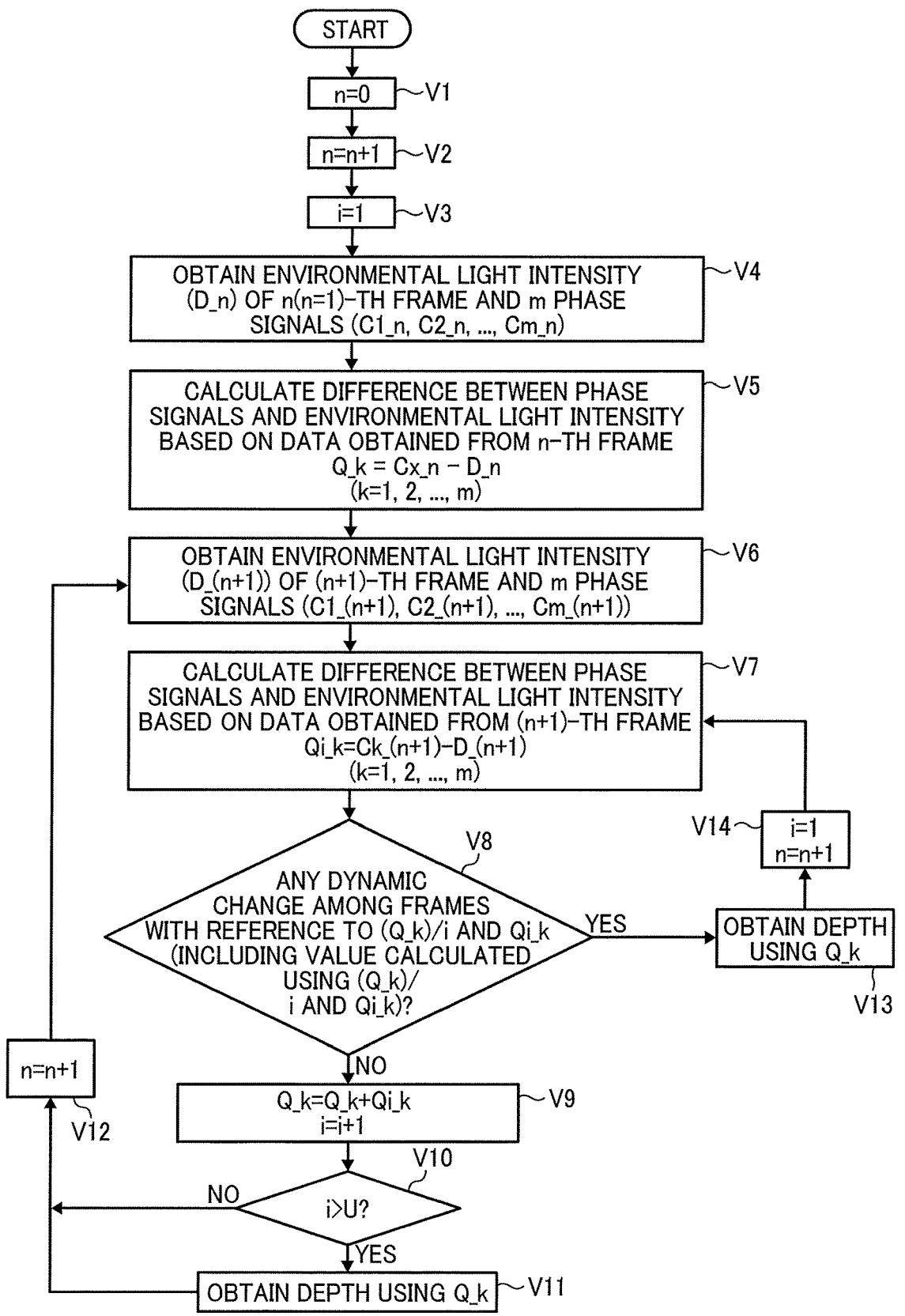
FIG. 15 is a flowchart of the fourth distance measuring processes, according to an embodiment of the present disclosure.

FIG. 15 is a flowchart of the fourth distance measuring processes according to the present embodiment.

The fourth distance measuring processes are performed for every pixel of the image sensor 29 under a similar procedure.

Steps V1 to V3 in FIG. 15 are equivalent to the steps S1 to S3 in FIG. 12, respectively.

In a step V4, environmental light intensity (D_n) of n(n=1)-th frame (i.e., the first frame) of the image sensor 29 is obtained, and m phase signals (Ck_n) (1≤k≤m) are obtained by temporally dividing one cycle (9π) that is determined by effective frequency $f_0$ of output signals that are output from the pixels to be measured. Here, the environmental light intensity (D_n) indicates an optical component other than an optical signal caused by the pulsed light emitted from the phototransmitter system 201, and indicates, for example, the sunlight or dark current. The environmental light intensity (D_n) may be obtained, for example, from the output signals from the image sensor 29 when the light source 21 is not emitting light.

In a step V5, the difference (Q_k) between the m phase signals (Ck_n) and the environmental light intensity (D_n) is obtained (where 1≤k≤m), and stored in the storage area $MA_Q$ of the buffer memory 204.

In a subsequent step V6, the environmental light intensity (D_(n+1)) of (n+1)-th frame (i.e., the current frame) is obtained, and m phase signals (Ck_(n+1)) (1≤k≤m) are obtained by temporally dividing one cycle (2π) that is determined by effective frequency $f_0$ of output signals that are output from the pixels to be measured.

In a subsequent step V7, the difference (Qi_k) between the m phase signals (Ck_(n+1)) and the environmental light intensity (D_(n+1)), where 1≤k≤m, is obtained.

In a subsequent step V8, whether or not there is a dynamic change is determined in the object area that corresponds to the pixels to be measured. More specifically, (Q_k)/i and (Qi_k) are compared with each other, and when these differences exceed a threshold, it is determined that a dynamic change is present. On the other hand, when these differences are equal to or less than the threshold, it is determined that a dynamic change is not present. When the result of determination is positive in the step V8, the processing shifts to the step V13, and when the result of determination is negative, the processing shifts to a step V9.

In a step V9, the value (Qi_k) of the current frame is added to the storage area $MA_Q$ of the buffer memory 204, and the counter i is updated.

In a subsequent step V10, whether or not "i>U" is determined. More specifically, whether the number of times (i) a moving average is obtained from Q_k of the frames up to the current frame is greater than a predetermined acceptance value U (U≥1) for the number of times a moving average is obtained is determined. When the result of determination is positive in the step V10, the processing shifts to a step V11, and when the result of determination is negative, the processing shifts to a step V12.

In the step V11, depth value (distance value) is calculated and obtained using the moving average data of Q_k of the frames up to the current frame, and the formula (1) and the formula (2) as above or the formula (3) as above. In so doing, the phase signals Ck in the formula (1), the formula (2), and the formula (3) as above are replaced with the corresponding moving average data of Q_k (where 1≤k≤m).

In a step V12, the counter n is updated. Once the step V12 is performed, the processing returns to the step V6.

In a step V13, depth value (distance value) is calculated and obtained using the moving average data of Q_k of the frames up to the frame immediately preceding the current frame, and the formula (1) and the formula (2) as above or the formula (3) as above. Accordingly, latency of one frame occurs. In so doing, the phase signals Ck in the formula (1), the formula (2), and the formula (3) as above are replaced with the corresponding moving average data of Q_k (where 1≤k≤m).

In a subsequent step V14, the counter i is initialized and the counter n is updated. Once the step V14 is performed, the processing returns to the step V6.

In the step V8 of FIG. 15, the average value (Q_k)/i of the frames up to the previous frame is used as a value to be compared with the value (Qi_k) of the current frame. However, for example, the value of the current frame may be compared with the value of the previous frame. Apart from such values of difference, there are a plurality of specific indices, for example, a derivative value and changes in the derivative value, to be used to compare the value of the current frame with the value of the past frames (e.g., the previous frame).

In FIG. 15, a step similar to the step V10 may be inserted between the step V8 and the step V13 as above.

The series of processes of FIG. 15 as described above are continuously performed until the measurement ends (until a measurement end signal is output from the distance computing unit 203 to the synchronous control unit 206). The measurement may end at any desired timing of the flowchart of FIG. 15.

Next, the fifth distance measuring processes that are performed using the distance sensor 20 are described with reference to the flowchart of FIG. 16.

Figure 16:
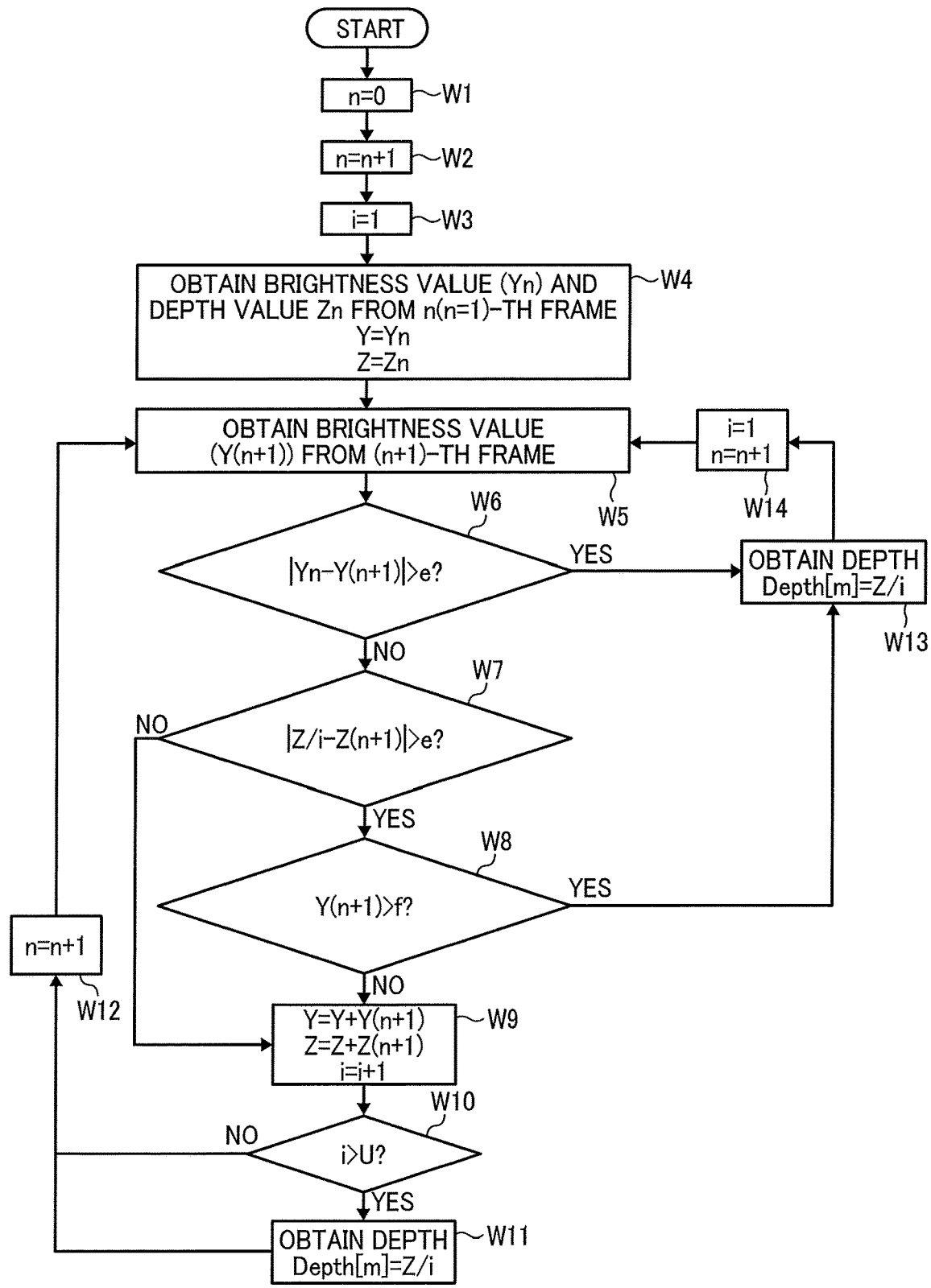
FIG. 16 is a flowchart of the fifth distance measuring processes, according to an embodiment of the present disclosure.

FIG. 16 is a flowchart of the fifth distance measuring processes according to the present embodiment.

The fifth distance measuring processes are performed for every pixel of the image sensor 29 under a similar procedure.

Steps W1 to W3 in FIG. 16 are equivalent to the steps S1 to S3 in FIG. 12, respectively.

In a step W4, a depth value Zn that is an output value from the distance sensor 20 on a frame-by-frame basis (i.e., a distance value calculated from a plurality of phase signals obtained from the relevant frame), and a brightness value Yn that is obtainable from the phase signals used to compute the depth value are obtained from the n(n=1)-th frame (i.e., the first frame), and Zn and Yn are stored in the storage areas $MA_Z$ and $MA_Y$ of the buffer memory 204, respectively.

In a subsequent step W5, in a similar manner to the step W4, the depth value Z(n+1) and the brightness value Y(n+1) are obtained from the (n+1)-th frame (i.e., the current frame).

In a subsequent step W6, whether or not there is a dynamic change is determined in an object area based on the brightness value. In particular, when the absolute value of the difference between the brightness value Yn of the n-th frame (i.e., the previous frame) and the brightness value Y(n+1) of the (n+1)-th frame (i.e., the current frame) is greater than a predetermined threshold e, it is determined that a dynamic change is present, and when the absolute value is equal to or less than the threshold e, it is determined that no dynamic change is present. When the result of determination is positive in the step W6, the processing shifts to the step W13, and when the result of determination is negative, the processing shifts to a step W7.

In a step W7, whether or not there is a dynamic change is determined in an object area based on the depth value. In particular, when the absolute value of the difference between the average of the depth values (Zn) of the frames up to the n-th frame (i.e., the previous frame) and the depth value Z(n+1) of the (n+1)-th frame (i.e., the current frame) is greater than a predetermined threshold c, it is determined that a dynamic change is present, and when the absolute value is equal to or less than the threshold e, it is determined that no dynamic change is present. In this configuration, the threshold c may be set by a user, or the threshold c may automatically be set in the adjustment steps of the production based on the characteristic value of the sensor. When the result of determination is positive in the step W7, the processing shifts to the step W8, and when the result of determination is negative, the processing shifts to the step W9.

In a step W8, whether or not there is a dynamic change is determined in an object area depending on whether the brightness value Y(n+1) of the (n+1)-th frame (i.e., the current frame) is greater than a predetermined threshold f. When the brightness value Y(n+1) is greater than the threshold f, it is determined that a dynamic change is present, and when the brightness value Y(n+1) is equal to or less than the threshold f, it is determined that a dynamic change is not present. In this configuration, the threshold f may be set by a user, or the threshold f may automatically be set in the adjustment steps of the production based on the characteristic value of the sensor. When the result of determination is positive in the step W8, the processing shifts to the step W13, and when the result of determination is negative, the processing shifts to the step W9.

The first reason why the step W8 is included is as follows. When the difference in brightness value between frames is small ("NO" in the step W6) and the brightness value Y(n+1) of the current frame is significantly small, variations (differences) in depth value among frames may increase due to the noise ("YES" in the step W7), and it may be determined that a dynamic change is present even though there is no dynamic change in actuality. Further, moving average calculations are not performed on the depth value Z(n+1) of the current frame. The above can be prevented by the step W8.

The second reason why the step W8 is included is as follows. Even if a dynamic change is present in actuality, there are some cases in which the difference in brightness value becomes small under certain conditions. In such cases, it is determined that a dynamic change is not present, and moving average calculations are performed on the depth value Z(n+1) of the current frame. The above can be prevented by the step W8. The brightness is inversely proportional to the square of the distance. For example, the brightness is inversely proportional to the square of the distance, and assuming that an object of reflectance of 25% is captured in the previous frame with distance 1 and that an object of reflectance of 100% is captured in the next frame with distance 2, the inter-frame relation in brightness value becomes as follows. A quadrupling almost cancels the relation in view of the above reflectance as in $(1/2)^2 = 1/4$, and even if a dynamic change is present in actuality, the difference in brightness value becomes small.

In a step W9, the brightness value Y(n+1) and the depth value Z(n+1) of the current frame are added to the storage areas $MA_Y$ and $MA_Z$ of the buffer memory 204, respectively, the counter i is updated.

In a subsequent step W10, whether or not "i>U" is determined. More specifically, whether the number of times (i) a moving average is obtained from the depth values Z of the frames up to the current frame is greater than a predetermined acceptance value U (U≥1) for the number of times a moving average is obtained is determined. When the result of determination is positive in the step W10, the processing shifts to a step W11, and when the result of determination is negative, the processing shifts to a step W12.

In a step W11, a moving average is obtained from the depth values Z of the frames up to the current frame, and the resultant data (Z/i) is obtained as the final depth value (distance value). In other words, when the brightness value of the current frame is small, it is determined that the noise is due to low brightness, and frame averaging is performed on frames including the current frame. Note that even if a dynamic change in an object were present in such an area of low brightness, such a dynamic change is substantially buried in noise and the disadvantages of ignoring such a dynamic change are outweighed by the benefits of performing frame averaging on frames including the current frame.

In a step W12, the counter n is updated. Once the step W12 is performed, the processing returns to the step W5.

In a step W13, a moving average is obtained from the depth values Z of the frames up to the frame immediately preceding the current frame, and the resultant data (Z/i) is obtained as the final depth value (distance value). Accordingly, latency of one frame occurs.

In a subsequent step W14, the counter i is initialized and the counter n is updated. Once the step W14 is performed, the processing returns to the step W5.

In FIG. 16, a step similar to the step W10 may be inserted between the step W6 and the step W13 as above or between the step W8 and the step W13.

In the first to fifth distance measuring processes as described above, some of the steps of distance measuring processes may be interchanged with each other.

The distance sensor (distance-measuring apparatus) 20 according to the present embodiment, as described above, includes the phototransmitter system 201 that emits pulsed light, the image sensor 29 (imaging element) that receives and photoelectrically converts, on a pixel-by-pixel basis, the pulsed light that is emitted from the phototransmitter system 201 and then reflected by an object into a plurality of electrical signals, and sorts obtained electrical signals into a plurality of phase signals, the buffer memory 204 that stores data including the plurality of phase signals or a value that is based on the plurality of phase signals, the dynamic change presence determining unit 205 (determining unit) that determines whether or not a dynamic change is present in the object on a pixel-by-pixel basis, based on the data of a current frame and at least one past frame, and the distance computing unit 203 that calculates distance to the object on a pixel-by-pixel basis using the data, according to a result of determination made by the dynamic change presence determining unit 205. When the dynamic change presence determining unit 205 determines that no dynamic change is present in the pixels of the image sensor 29, the distance computing unit 203 pertains moving average calculations on the data of at least two of the current frame and a plurality of frames including the at least one past frame, and obtains the distance from a result of the moving average calculations. On the other hand, when the dynamic change presence determining unit 205 determines that a dynamic change is present, the at least one past frame includes a plurality of past frames, and the distance computing unit 203 performs the moving average calculations on the data of the multiple past frames and obtains the distance from a result of the moving average calculations.

In such a configuration, when it is determined that no dynamic change is present in the pixels, moving average calculations are pertained on the data of at least two of the current frame and a plurality of frames including the at least one past frame, and the distance to the object is obtained from a result of the moving average calculations. Accordingly, the distance to the object can accurately be measured. On the other hand, when it is determined that a dynamic change is present in the pixels, the moving average calculations are performed on the data of the multiple past frames, and the distance to the object is obtained from a result of the moving average calculations. Accordingly, the data of the current frame is not used to calculate the distance, and the distance to the object before a dynamic change is determined to be present can accurately be measured. In this configuration, latency of at least one frame occurs. However, as the distance immediately before a dynamic change occurs to an object is calculated, almost no error occurs in distance measurement, and it is beneficial in reducing noise.

Accordingly, regardless of the presence or absence of a dynamic change in an object, the distance to the object can accurately be measured.

When the dynamic change presence determining unit 205 determines that no dynamic change is present in the pixels of the image sensor 29, the distance computing unit 203 performs moving average calculations on the data of at least two of the current frame and a plurality of frames including the at least one past frame, and obtains the distance to the object from a result of the moving average calculations. On the other hand, when the dynamic change presence determining unit 205 determines that a dynamic change is present, the distance computing unit 203 may obtain the distance to the object according to the data (the multiple phase signals or a value that is based on the multiple phase signals) of the current frame or a future frame (a frame at a later time than the current frame).

In such a configuration, when it is determined that no dynamic change is present in the pixels, moving average calculations are performed on the data of at least two of the current frame and a plurality of frames including the at least one past frame, and the distance to the object is obtained from a result of the moving average calculations. Accordingly, the distance to the object can accurately be measured. On the other hand, when it is determined that a dynamic change is present in the pixels, the distance to the object is obtained from the data of the current frame or a future frame (e.g., the frame immediately after the current frame, and a frame at a later time than the current frame by several frames). Accordingly, the distance to the object after a dynamic change is determined to be present can accurately be measured. In this configuration, effective noise reduction cannot be expected, but the latest distance to the object can be measured for the pixels where a dynamic change is determined to be present.

Accordingly, regardless of the presence or absence of a dynamic change in an object, the distance to the object can accurately be measured.

When the dynamic change presence determining unit 205 determines that a dynamic change is present in the pixels, the distance computing unit 203 may compute the distance to an object using a result of moving average calculations performed on the phase signals corresponding to the multiple past frames.

In such a configuration, the distance to the object can stably and accurately be measured the pixels where a dynamic change is determined to be present.

When the dynamic change presence determining unit 205 determines that a dynamic change is present in the pixels, the distance computing unit 203 may compute the distance to an object using a result of moving average calculations performed on a value obtained from the of phase signals of the multiple past frames.

In such a configuration, the distance to the object can stably and accurately be measured for the pixels where a dynamic change is determined to be present.

When the dynamic change presence determining unit 205 determines that a dynamic change is present in the pixels, the distance computing unit 203 may output, as the distance to an object, a result of the moving average calculations performed on a depth value (distance value) obtained from the phase signals of the multiple past frames.

In such a configuration, the distance to the object can stably and accurately be measured for the pixels where a dynamic change is determined to be present.

When the dynamic change presence determining unit 205 determines that no dynamic change is present in the pixels, the distance computing unit 203 may calculate the distance to the object using a result of performing the moving average calculations on ones of the plurality of phase signals corresponding to at least two of the current frame and a plurality of frames including the at least one past frame.

In such a configuration, the distance to the object can stably and accurately be measured for the pixels where no dynamic change is determined to be present.

When the dynamic change presence determining unit 205 determines that no dynamic change is present in the pixels, the distance computing unit 203 may calculate the distance to the object using a result of performing the moving average calculations on a value obtained from the multiple phase signals of at least two of the current frame and a plurality of frames including at least one past frame.

In such a configuration, the distance to the object can stably and accurately be measured for the pixels where no dynamic change is determined to be present.

When the dynamic change presence determining unit 205 determines that no dynamic change is present in the pixels, the distance computing unit 203 may outputs, as the distance to an object, a result of the moving average calculations performed on a distance value obtained from the multiple phase signals of at least two of the current frame and multiple frames including at least one past frame.

In such a configuration, the distance to the object can stably and accurately be measured for the pixels where no dynamic change is determined to be present.

Moreover, it is desired that the distance computing unit 203 compute the distance using a result of performing the moving average calculations on target pixels several times equal to or greater than a prescribed number of times, or it is desired that the distance computing unit 203 output the above result as the distance.

In such a configuration, the distance to the object can further accurately be measured regardless of the presence or absence of a dynamic change in the object.

The dynamic change presence determining unit 205 may refer to a phase signal Ck (k=1, 2, . . . , M) that divides a pulse cycle of the pulsed light into m cycles (m≥3), and may determine whether a dynamic change is present in an object on a pixel-by-pixel basis by comparing an inter-frame change in a sine component A of a phase difference and an inter-frame change in a cosine component B of the phase difference, each of which is obtained in $$A = \Sigma_{k=1}^{m}\{Ck\_n \times \sin(2\pi/m \times (k-1))\}$$

$$B = \Sigma_{k=1}^{m}\{Ck\_n \times \cos(2\pi/m \times (k-1))\}$$

with predetermined thresholds a and b, respectively.

The dynamic change presence determining unit 205 may refer to a phase signal Ck (k=1, 2, . . . , M) that divides a pulse cycle of the pulsed light emitted from the phototransmitter system 201 into m cycles (m≥2), and may determine whether a dynamic change is present in an object on a pixel-by-pixel basis by comparing an inter-frame change in the difference between an environmental light intensity obtained using the image sensor 29 and the phase signals with a predetermined threshold.

Assuming that the pulse width of the pulsed light emitted from the phototransmitter system 201 is $T_0$, it is desired that the pulse cycle of the pulsed light be equal to or greater than $2T_0$. In other words, it is desired that the duty of the pulsed light emitted from the phototransmitter system 201 be equal to or less than 50%.

The dynamic change presence determining unit 205 may determine whether there is any dynamic change in an object on a pixel-by-pixel basis by comparing an inter-frame change in a depth value (distance value) detected on a frame-by-frame basis with a predetermined threshold.

Further, the dynamic change presence determining unit 205 may determine whether there is any dynamic change in an object on a pixel-by-pixel basis by comparing an inter-frame change in a brightness value detected on a frame-by-frame basis with a predetermined threshold e.

As the vehicle 1 is provided with the distance sensor 20, the vehicle 1 can travel with a high degree of reliability.

A method of measuring distance according to the present embodiment includes a step of emitting pulsed light, a step of receiving and photoelectrically converting, on a pixel-by-pixel basis, the pulsed light emitted and reflected by an object into a plurality of electrical signals, a step of sorting obtained electrical signals into a plurality of phase signals, a step of storing data including the multiple phase signals or a value that is based on the multiple phase signals, a step of determining, on a pixel-by-pixel basis, whether or not a dynamic change is present in the object, based on the phase signals of a current frame and at least one past frame, and a step of calculating, on a pixel-by-pixel basis, distance to the object using the above data, according to a result of determination made by the determining. When it is determined by the step of determining that no dynamic change is present in the pixels, the step of calculating includes a step of performing moving average calculations on the data of at least two of the current frame and a plurality of frames including the at least one past frame, and a step of obtaining the distance from a result of the moving average calculations. When it is determined in the step of determining that a dynamic change is present, the at least one past frame includes a plurality of past frames, and the step of calculating includes a step of performing the moving average calculations on the data of the plurality of past frames and a step of obtaining the distance from a result of the moving average calculations.

In such a configuration, when it is determined that no dynamic change is present in the pixels, moving average calculations are performed on the data of at least two of the current frame and a plurality of frames including at least one past frame, and the distance to the object is obtained from a result of the moving average calculations. Accordingly, the distance to the object can accurately be measured. On the other hand, when it is determined that a dynamic change is present in the pixels, the moving average calculations are performed on the data of the multiple past frames, and the distance to the object is obtained from a result of the moving average calculations. Accordingly, the phase signals of the current frame are not used to calculate the distance, and the distance to the object before a dynamic change is determined to be present can accurately be measured. In this configuration, latency of at least one frame occurs. However, as the distance immediately before a dynamic change occurs to an object is calculated, almost no error occurs in distance measurement, and it is beneficial in reducing noise.

Accordingly, the distance to the object can accurately be measured regardless of the presence or absence of a dynamic change in the object.

When it is determined by the step of determining that no dynamic change is present in the pixels, the step of calculating includes a step of performing moving average calculations on the data of at least two of the current frame and a plurality of frames including the at least one past frame, and a step of obtaining the distance from a result of the moving average calculations. when it is determined in the above step of determining that a dynamic change is present, the distance may be obtained according to the data (for example, the multiple phase signals or a value that is based on the multiple phase signals) of the current frame or a future frame (a frame at a later time than the current frame).

In such a configuration, when it is determined that no dynamic change is present in the pixels, moving average calculations are performed on the data of at least two of the current frame and a plurality of frames including the at least one past frame, and the distance to the object is obtained from a result of the moving average calculations. Accordingly, the distance to the object can accurately be measured. On the other hand, when it is determined that a dynamic change is present in the pixels, the distance to the object is obtained from the data of the current frame or a future frame (e.g., the frame immediately after the current frame, and a frame at a later time than the current frame by several frames). Accordingly, the distance to the object after a dynamic change is determined to be present can accurately be measured. In this configuration, effective noise reduction cannot be expected, but the latest distance to the object can be measured for the pixels where a dynamic change is determined to be present.

Accordingly, regardless of the presence or absence of a dynamic change in an object, the distance to the object can accurately be measured.

In the embodiment described above, the phototransmitter system is a non-scanning phototransmitter system. However, the phototransmitter system may be a scanning phototransmitter system such as a light deflector (for example, a polygon mirror, a galvano mirror, and a micro-electromechanical systems (MEMS) mirror). In such a configuration, for example, a plurality of light rays that are emitted from a plurality of light emitters, respectively, that are arranged in one direction (line light source) may be scanned in a direction not parallel to the one direction in which the light emitters are arranged (for example, a direction orthogonal to the one direction in which the light emitters are arranged), and be received by a plurality of light receivers that are arranged in parallel with the one direction in which the light emitters are arranged (line image sensor). By so doing, a distance image is generated. Alternatively, the light that is emitted from a single light emitter may be two-dimensionally scanned by a light deflector, and the light that is reflected from an object may be received by an area image sensor to generate a distance image.

In the embodiments described above, cases in which the distance sensor 20 that serves as an example of the distance-measuring apparatus according to the embodiments of the present disclosure is used for the vehicle 1 are described. However, no limitation is intended thereby. For example, the distance sensor 20 may be used, for example, for a mobile object (for example, a car, a ship, and an aircraft) other than the vehicle 1, a surveillance camera, a three-dimensional measuring device that measures the three-dimensional shape of an object, and a robot that autonomously moves while the distance sensor 20 is checking its own current position.

With a surveillance camera provided with the distance sensor 20, high-quality monitor images can be obtained regardless of the presence or absence of a dynamic change in an object to be monitored.

With a three-dimensional measuring device provided with the distance sensor 20, the three-dimensional data of the object can precisely be obtained regardless of the presence or absence of a dynamic change in an object to be measured.

With a robot provided with the distance sensor 20, regardless of the presence or absence of a dynamic change in surrounding objects appropriate autonomous movement (such as approaching operation, moving-away operation, and translation operation) with respect to the object is achieved.

In the embodiment described above, cases in which pulses of light are emitted from a single light-emitting diode (LED) (light emitter) and the light that is reflected from an object is received by an area image sensor are described. However, no limitation is intended thereby.

For example, pulses of light are sequentially emitted from a plurality of two-dimensionally arranged light emitters, and the pulses of light that are emitted from the multiple light emitters and reflected by an object may be sequentially received by a single light receiver to generate a distance image.

For example, pulses of light may be simultaneously emitted from a plurality of two-dimensionally arranged light emitters, and a plurality of pulses of light that are emitted from the multiple light emitters and then reflected by an object may be simultaneously received by a plurality of light receivers, respectively, that are two-dimensionally arranged. By so doing, a distance image is generated.

For example, when simply the distance to a certain object is to be measured and the acquisition of a three-dimensional data (distance image) of the object is not desired, only a single light emitter and a single light receiver may be provided for the phototransmitter system and the photoreceptor system, respectively.

In the embodiments described above, a buffer memory is used as a storage unit that stores phase signals. However, no limitation is intended thereby, and other kinds of memory (such as flash memory, read-only memory (ROM), and a random access memory (RAM)) or a hard disk drive (HDD) may be used.

In the embodiments described above, the position controller 40 may perform some of the processes of the distance computing unit 203, and the distance computing unit 203 may perform some of the processes of the position controller 40.

In the embodiments described above, cases in which the traveling control device 10 includes a single distance sensor 20 are described. However, no limitation is indicated thereby. For example, the traveling control device 10 may include a plurality of distance sensors 20 according to, for example, the size of a vehicle and the measurable area.

In the embodiments described above, cases in which the distance sensor 20 is used for the traveling control device 10 that monitors an area in the directions of travel of a vehicle. However, no limitation is indicated thereby. For example, the distance sensor 20 may be provided for an apparatus that monitors the rear view or side view of the vehicle.

In view of the above circumstances, the distance-measuring apparatus and the distance-measuring method according to the embodiments of the present disclosure may be widely applied to all aspects of distance measuring technologies where time-of-flight (TOF) is adopted.

In other words, the distance-measuring apparatus and the distance-measuring method according to the embodiments of the present disclosure may be applied to acquisition of two-dimensional data of an object or detection of the presence or absence of an object.

Further, the concrete numerical values, shapes, and the like are just examples and can be appropriately modified without departing from the spirit of the present disclosure.

Hereinafter, how the above embodiments of the present disclosure are conceived are described.

As an example of three-dimensional sensor, so-called time-of-flight (TOF) sensors that calculate the distance to an object by projecting modulated reference light and measuring the length of time it takes for the projected light to be reflected by the object and return to the sensor are known in the art. The TOF sensors have theoretical superiority in responsiveness over other three-dimensional sensing methods, and its application to various kinds of usage is being developed.

For example, application to gesture recognition or position control of a mobile object such as a robot and a car is expected.

The TOF methods include a direct TOF method where a time difference is directly detected, and an indirect TOF method where a time difference is detected by computation using an amount of detected light signal. As known in the art, the direct TOF method is suitable for measuring long distances, and the indirect TOF method is suitable for measuring short distances.

A TOF sensor that uses the indirect TOF method obtains the distance by computation using an amount of detected light signal. However, in so doing, measured values temporally vary due to shot noise or background noise.

As a methodology for handling the noise of the TOF sensor, a moving average method is known. In such a moving average method, when there exists a dynamic object while simple moving average calculations are adopted, the signals that are obtained from such a dynamic object and the background may be mixed up in the output due to the moving average calculations, and an originally intended distance value cannot be obtained.

In a video processing device that calculates a depth value using the depth values of a plurality of frames, a weighting value is determined based on the difference between the points in time when the first frame and the second frame of an original image are obtained, respectively, and a corrected depth image that is corrected according to the depths of a plurality of frames is generated. Also, a plurality of methods for assigning weights to lower-order frames are known.

Moreover, methods are known for assigning weights to moving average calculations based on the different times at which the frames of original images are obtained. However, in such methods, when the level of weighting is increased, the impact of variations in a heavily weighted frame becomes strong, and the effect of noise reduction, which is the originally intended purpose of the moving average calculations, becomes small. By contrast, if the level of weighting is reduced, the impact of a dynamic object, which is originally intended to be small, tends to remain. When there are cases in which an object momentarily and abruptly moves, the above methods cannot effectively avoid the impacts as above.

Alternatively, four-phase TOF methods in which a phase difference is computed upon detecting the phases of reflected signals in a cycle of $\pi/2$ are also known. these phase signals are referred to as Q0, Q90, Q180, and Q270, respectively. Assuming that the same object with the same distance is being observed with the respective phase signals, the following relation is theoretically valid. Q0+Q180≈Q90+Q270

Concrete methods of obtaining Q0 to Q270 include a method where Q0 to Q270 are obtained from spatially-divided different pixels, and a method where Q0 to Q270 are obtained from a same pixel in a temporally divided manner.

When the difference between Q0+Q180 and Q90+Q270 is large in the above methods, these phase signals are considered to be signals obtained from spatially or temporally different objects in view of the above theoretical relation, and the depth that is obtained from these signals ends in an abnormal value.

When the difference between Q0+Q180 and Q90+Q270 exceeds a predetermined threshold, it is determined that accurate depth cannot be obtained, and no distance computing is performed (pixels are left undefined).

However, in a configuration where whether the four phase signals are obtained from the same object is determined and no distance computation is performed when it is determined that the four phase signals are not obtained from the same object, there are some cases where no distance measurement is performed depending on, for example, the presence or absence of a dynamic change in an object.

As known in the art, distance data and brightness data can be obtained from a TOF sensor. However, for example, in cases where moving average calculations and determination are performed based only on the data of neighboring frames, its signal-to-noise ratio (S/N) may become low and the variations in measured distance significantly may increase when the reflectance of an object is low or when the object is distant. In such cases, it is difficult to separate variations in measured distance from a dynamic change in the object, and sufficient noise reduction cannot be achieved in such an area where the variations in measured distance are large.

When moving average calculations and determination are performed based only on the brightness data, it is not possible to specify the reflectance of an object in advance. Even if a dynamic change is preset in the object, changes in brightness value may be small depending on the reflectance of the object and the background and the distance between the object and the background. In such cases, the moving average calculations and determination may be affected by a dynamic object.

Accordingly, the related art seemed susceptible to improvement in measuring the distance to the object with high accuracy regardless of the presence or absence of a dynamic change in the object.

In order to handle such a situation, the embodiments as described above have been conceived.

In the embodiments of the present disclosure as above, in particular, whether there is any dynamic change (for example, movement or deformation) in a being-captured object is determined on a pixel-by-pixel basis, using, for example, signals obtained from the current frame and past frames of an imaging element. When there is no dynamic change or only a small dynamic change is present, moving average calculations are to be performed on the data (e.g., obtained signals or a value obtained from the obtained signals) of the current frame. When there is a dynamic change, moving average calculations are performed on the data (i.e., obtained signals or a value obtained from the obtained signals) of the multiple past frames. Accordingly, a generated depth image (distance image) is substantially free from the impact of a dynamic change, and application to a dynamic object can be made. Moreover, a high level of noise reduction is achieved for a static object.

In the above embodiments of the present disclosure, whether there is any dynamic change (for example, movement or deformation) in an object is determined on a pixel-by-pixel basis, based on the difference between the detection signals of the current frame and a past frame (for example, the frame immediately preceding the current frame) on a pixel-by-pixel basis, or based on the difference between the a pair of results of performing predetermined computation using the detection signals. When there is a dynamic change, moving average calculations are not performed on the data of the current frame, and the moving average calculations are performed only on the data of the multiple past frames. when there is no dynamic change, moving average calculations are performed on the data of at least one of the current frame and at least one past frame.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A distance-measuring apparatus comprising:
a light source to emit pulsed light;
an image sensor to receive and photoelectrically convert the pulsed light, which is emitted from the light source and then reflected by an object, into a plurality of electrical signals, and to sort the plurality of electrical signals into a plurality of phase signals corresponding to frames;
a memory to store data including the plurality of phase signals or a value that is based on the plurality of phase signals;
circuitry configured to determine whether or not a dynamic change is present in the object, based on the data of a current frame and at least one past frame; and
circuitry configured to calculate distance to the object using the data, according to a result of determination made by the circuitry configured to determine,
wherein when the circuitry configured to determine determines that the dynamic change is not present, the circuitry configured to calculate performs moving average calculations on the data of at least two of the frames, and obtains the distance from a result of the moving average calculations, wherein when the circuitry configured to determine determines that the dynamic change is present, the circuitry configured to calculate obtains the distance from only the data of the current frame or a future frame, wherein the circuitry configured to determine determines whether the dynamic change is present in the object by comparing an inter-frame change in a distance value detected on a frame-by-frame basis with a prescribed threshold.

2. The distance-measuring apparatus according to claim 1, wherein when the circuitry configured to determine determines that the dynamic change is not present, the circuitry configured to calculate computes the distance using a result of performing the moving average calculations on ones of the plurality of phase signals corresponding to at least two of the current frame and a plurality of frames including the at least one past frame.

3. The distance-measuring apparatus according to claim 1, wherein when the circuitry configured to determine determines that the dynamic change is not present, the circuitry configured to calculate computes the distance using a result of performing the moving average calculations on a value obtained from the plurality of phase signals of at least two of the current frame and a plurality of frames including the at least one past frame.

4. The distance-measuring apparatus according to claim 1, wherein when the circuitry configured to determine determines that the dynamic change is not present, the circuitry configured to calculate outputs, as the distance, a result of the moving average calculations performed on a distance value obtained from the plurality of phase signals of at least two of the current frame and a plurality of frames including at least one past frame.

5. A surveillance camera comprising the distance-measuring apparatus according to claim 1.

6. A three-dimensional measuring device comprising the distance-measuring apparatus according to claim 1.

7. A mobile object comprising the distance-measuring apparatus according to claim 1.

8. A robot comprising the distance-measuring apparatus according to claim 1.

9. The distance-measuring apparatus according to claim 1, wherein the data of at least two of the frames corresponds to:
data of at least two frames including the current frame and at least one of a plurality of past frames, or
data of at least two of the plurality of past frames.

10. A distance-measuring apparatus comprising:
a light source to emit pulsed light;
an image sensor to receive and photoelectrically convert the pulsed light, which is emitted from the light source and then reflected by an object, into a plurality of electrical signals, and to sort the plurality of electrical signals into a plurality of phase signals corresponding to frames;
a memory to store data including the plurality of phase signals or a value that is based on the plurality of phase signals;
circuitry configured to determine whether or not a dynamic change is present in the object, based on the data of a current frame and at least one past frame; and
circuitry configured to calculate distance to the object using the data, according to a result of determination made by the circuitry configured to determine, wherein when the circuitry configured to determine determines that the dynamic change is not present, the circuitry configured to calculate performs moving average calculations on the data of at least two of the frames, and obtains the distance from a result of the moving average calculations, wherein when the circuitry configured to determine determines that the dynamic change is present, the circuitry configured to calculate obtains the distance from only the data of the current frame or a future frame, and wherein the circuitry configured to determine refers to a phase signal Ck (k=1, 2, . . . , M) that divides a pulse cycle of the pulsed light into m cycles (m≥3), and determines whether the dynamic change is present in the object by comparing an inter-frame change in a sine component A of a phase difference and an inter-frame change in a cosine component B of the phase difference obtained in $$A=\Sigma_{k=1}^{m}\{Ck\_n\times\sin(2\pi/m\times(k-1))\}$$

$$B=\Sigma_{k=1}^{m}\{Ck\_n\times\cos(2\pi/m\times(k-1))\}$$

with a prescribed threshold.

11. The distance-measuring apparatus according to claim 10, wherein when pulse width of the pulsed light is T0, the pulse cycle is equal to or greater than 2T0.

12. A distance-measuring apparatus comprising:
a light source to emit pulsed light;
an image sensor to receive and photoelectrically convert the pulsed light, which is emitted from the light source and then reflected by an object, into a plurality of electrical signals, and to sort the plurality of electrical signals into a plurality of phase signals corresponding to frames;
a memory to store data including the plurality of phase signals or a value that is based on the plurality of phase signals;
circuitry configured to determine whether or not a dynamic change is present in the object, based on the data of a current frame and at least one past frame; and
circuitry configured to calculate distance to the object using the data, according to a result of determination made by the circuitry configured to determine, wherein when the circuitry configured to determine determines that the dynamic change is not present, the circuitry configured to calculate performs moving average calculations on the data of at least two of the frames, and obtains the distance from a result of the moving average calculations, wherein when the circuitry configured to determine determines that the dynamic change is present, the circuitry configured to calculate obtains the distance from only the data of the current frame or a future frame, and wherein the circuitry configured to determine refers to a phase signal Ck (k=1, 2, . . . , M) that divides a pulse cycle of the pulsed light into m cycles (m≥2), and determines whether the dynamic change is present in the object by comparing an inter-frame change in a difference between an environmental light intensity obtained using the imaging element and the plurality of phase signals with a prescribed threshold.

13. The distance-measuring apparatus according to claim 1, wherein the circuitry configured to determine determines whether the dynamic change is present in the object by comparing an inter-frame change in a brightness value detected on a frame-by-frame basis with a prescribed threshold.

\* \* \* \* \*